United States Patent
Ohkubo

(10) Patent No.: US 10,256,446 B2
(45) Date of Patent: Apr. 9, 2019

(54) BINDER COMPOSITION FOR SECONDARY BATTERY POROUS MEMBRANE, SLURRY FOR SECONDARY BATTERY POROUS MEMBRANE, POROUS MEMBRANE FOR SECONDARY BATTERY, AND SECONDARY BATTERY

(71) Applicant: ZEON CORPORATION, Chiyoda-ku, Tokyo (JP)

(72) Inventor: Yuuki Ohkubo, Tokyo (JP)

(73) Assignee: ZEON CORPORATION, Chiyoda-ku, Tokyo (JP)

( * ) Notice: Subject to any disclaimer, the term of this patent is extended or adjusted under 35 U.S.C. 154(b) by 256 days.

(21) Appl. No.: 15/116,634

(22) PCT Filed: Feb. 3, 2015

(86) PCT No.: PCT/JP2015/053011
§ 371 (c)(1),
(2) Date: Aug. 4, 2016

(87) PCT Pub. No.: WO2015/129408
PCT Pub. Date: Sep. 3, 2015

(65) Prior Publication Data
US 2016/0359156 A1 Dec. 8, 2016

(30) Foreign Application Priority Data

Feb. 27, 2014 (JP) ................. 2014-036336

(51) Int. Cl.
*H01M 2/16* (2006.01)
*H01M 4/13* (2010.01)
*C08F 220/18* (2006.01)
*H01M 4/62* (2006.01)
*C08K 3/22* (2006.01)
*C08L 33/06* (2006.01)
*H01M 2/14* (2006.01)
*H01M 10/0525* (2010.01)
*H01M 10/052* (2010.01)

(52) U.S. Cl.
CPC ........... *H01M 2/162* (2013.01); *C08F 220/18* (2013.01); *C08K 3/22* (2013.01); *C08L 33/062* (2013.01); *H01M 2/145* (2013.01); *H01M 2/16* (2013.01); *H01M 2/1653* (2013.01); *H01M 4/13* (2013.01); *H01M 4/622* (2013.01); *H01M 10/0525* (2013.01); *C08K 2003/2227* (2013.01); *H01M 10/052* (2013.01)

(58) Field of Classification Search
CPC ...... H01M 2/16; H01M 10/0525; H01M 2/14; H01M 4/13; H01M 2/1653; H01M 4/622; H01M 2/145; H01M 2/162; C08K 3/22; C08L 33/06; C08L 33/062; C08F 212/08; C08F 220/20; C08F 220/18
See application file for complete search history.

(56) References Cited

U.S. PATENT DOCUMENTS

| | | | | |
|---|---|---|---|---|
| 7,914,704 B2* | 3/2011 | Yamakawa | ............ | H01G 11/28 252/500 |
| 7,939,600 B2* | 5/2011 | Mori | ...................... | H01G 9/058 524/804 |
| 2006/0134526 A1* | 6/2006 | Han | ...................... | H01M 2/145 429/251 |
| 2008/0011986 A1* | 1/2008 | Yamakawa | ............ | H01G 11/28 252/500 |
| 2011/0091774 A1* | 4/2011 | Wakizaka | ................. | C08J 5/18 429/246 |

FOREIGN PATENT DOCUMENTS

| | | |
|---|---|---|
| EP | 2282364 A1 | 2/2011 |
| WO | 2009123168 A1 | 10/2009 |
| WO | 2013125645 A1 | 8/2013 |

OTHER PUBLICATIONS

JP2013122099 (Year: 2013).*
Notification to Grant Patent issued by SIPO dated Jul. 31, 2018 for application # 2015800006890 (Chinese counterpart of the instant Application) (Year: 2008).*
Aug. 30, 2016, International Preliminary Report on Patentability issued in the International Patent Application No. PCT/JP2015/053011.

* cited by examiner

*Primary Examiner* — Alexander Usyatinsky
(74) *Attorney, Agent, or Firm* — Kenja IP Law PC

(57) ABSTRACT

A binder composition for a porous membrane of a secondary battery, including a polycarboxylic acid and water, wherein the polycarboxylic acid includes a carboxylic acid group-containing monomer unit in an amount of 20% by weight or more and 50% by weight or less, the polycarboxylic acid is water-insoluble at a pH of 6.5 or less and water-soluble at a pH of 8 or more, and the binder composition for a porous membrane of a secondary battery has a pH of 6.5 or less; and a slurry for a porous membrane of a secondary battery using the binder composition, a porous membrane for a secondary battery, and a secondary battery.

9 Claims, No Drawings

BINDER COMPOSITION FOR SECONDARY BATTERY POROUS MEMBRANE, SLURRY FOR SECONDARY BATTERY POROUS MEMBRANE, POROUS MEMBRANE FOR SECONDARY BATTERY, AND SECONDARY BATTERY

FIELD

The present invention relates to a binder composition for a porous membrane of a secondary battery, a slurry for a porous membrane of a secondary battery, and a porous membrane for a secondary battery, and a secondary battery.

BACKGROUND

Secondary batteries are widely used as a power source of portable equipment in recent years. In particular, lithium ion secondary batteries can be small in size and low in weight, have a high energy density, and can be repeatedly charged and discharged. On the basis of such properties, lithium ion secondary batteries are expected to grow in demand. Such lithium ion secondary batteries are utilized in apparatuses such as cellular phones and notebook personal computers, taking advantage of the high energy density. Since the apparatuses to which secondary batteries are applied have been improved in performance, secondary batteries are demanded to be further improved in performance. For example, secondary batteries are demanded to have improved performances such as an ability to maintain their capacity even after charge and discharge are repeated in a high-temperature environment (high-temperature cycle property).

A secondary battery is provided with a separator between a positive electrode and a negative electrode in order to improve its performance. As the separator, there is known a porous membrane obtained by applying a layer of a slurry containing non-conductive particles and a binder onto a substrate to form a layer and then drying the layer. As the slurry for forming the porous membrane, a so-called aqueous slurry prepared by using water as a solvent is becoming widespread in order to, for example, reduce load on the environment. Furthermore, it is known to use a variety of polymers as the binder that is a component of the slurry for forming the porous membrane (Patent Literatures 1 and 2).

Such a slurry can be prepared with the physical properties such as viscosity falling within preferable ranges, whereby favorable application and facilitated manufacture of a high-quality porous membrane can be achieved. Furthermore, when a slurry or constituent materials of a slurry are prepared and preserved prior to application, the slurry or the constituent materials is/are required to have a property of maintaining a stable state for an extended period of time without deterioration such as separation of a solid content. For imparting such a property to a slurry, a cellulose-based polymer such as carboxymethyl cellulose (CMC) is often added to the slurry.

CITATION LIST

Patent Literature

Patent Literature 1: International Publication No. WO2013/125645
Patent Literature 2: International Publication No. WO2009/123168 (corresponding publication: European Patent Application Publication No. EP2282364)

SUMMARY

Technical Problem

However, a cellulose-based polymer such as carboxymethyl cellulose has high hydrophilicity. Therefore, there is a problem that the polymer increases the content of moisture remaining in the porous membrane after the slurry layer has been dried. Such a high content of moisture remaining in the porous membrane causes impairment of performance of the aforementioned secondary battery. For this reason, there is a demand for a polymer that can be used as a substitute for a part or all of a cellulose-based polymer such as carboxymethyl cellulose and can provide favorable physical properties to the slurry for a porous membrane.

Such a slurry for a porous membrane further has a problem that the preservation stability is low, and thus the slurry needs to be prepared in an amount necessary for an operation of preparing the porous membrane immediately before the operation, causing manufacture of the porous membrane to be complicated.

Therefore, an object of the invention is to provide: a secondary battery that can be easily manufactured and has improved performance such as high-temperature cycle property; a porous membrane for a secondary battery that can improve the performance of such a secondary battery and can be easily manufactured; a slurry for a porous membrane of a secondary battery that can be used as a material of such a porous membrane, can achieve easy application, and has excellent preservation stability; and a binder composition for a porous membrane of a secondary battery that can be used as a material of such a slurry for a porous membrane and has excellent preservation stability.

Solution to Problem

The present inventor has conducted research in order to achieve the aforementioned objects. In particular, the present inventor has conducted research on adopting a specific polycarboxylic acid as a polymer to be added to an aqueous slurry for a porous membrane. However, when a polycarboxylic acid is used to manufacture a slurry for a porous membrane, the preservation stability of the slurry is poor. The present inventor has further conducted a research on this regard, and has arrived at taking advantage of the fact that the specific polycarboxylic acid has high preservation stability in an acidic condition while it can provide an appropriate viscosity to a slurry in an alkaline condition. The present inventor has further found that both of the high preservation stability of the binder composition and the appropriate viscosity in use can be enjoyed by preparing the specific polycarboxylic acid as an acidic binder composition for a porous membrane, and mixing this composition with a dispersion liquid of a non-conductive particle when used to obtain an alkaline slurry. Thus, the present invention has been achieved. That is, according to the present invention, the following (1) to (7) are provided.

(1) A binder composition for a porous membrane of a secondary battery, comprising a polycarboxylic acid and water, wherein
the polycarboxylic acid includes a carboxylic acid group-containing monomer unit in an amount of 20% by weight or more and 50% by weight or less,
the polycarboxylic acid is water-insoluble at a pH of 6.5 or less and water-soluble at a pH of 8 or more, and
the binder composition for a porous membrane of a secondary battery has a pH of 6.5 or less.

(2) The binder composition for a porous membrane of a secondary battery according to (1), wherein the polycarboxylic acid includes an alkyl (meth)acrylate unit in an amount of 50% by weight or more.

(3) The binder composition for a porous membrane of a secondary battery according to (2), wherein the alkyl (meth)acrylate unit includes an alkyl (meth) acrylate unit (U1) having an alkyl group having 1 to 3 carbon atoms and an alkyl (meth)acrylate unit (U2) having an alkyl group having 4 to 6 carbon atoms, and the unit (U1) and the unit (U2) in the polycarboxylic acid have a weight ratio U1/U2 of 1.0 to 10.0.

(4) The binder composition for a porous membrane of a secondary battery according to any one of (1) to (3), wherein the polycarboxylic acid has a glass transition temperature of lower than 30° C.

(5) A slurry for a porous membrane of a secondary battery, comprising a non-conductive particle, a polycarboxylic acid, and water, wherein the polycarboxylic acid includes a carboxylic acid group-containing monomer unit in an amount of 20% by weight or more and 50% by weight or less, the polycarboxylic acid is water-insoluble at a pH of 6.5 or less and water-soluble at a pH of 8 or more, and the slurry for a porous membrane of a secondary battery has a pH of more than 7.0.

(6) A porous membrane for a secondary battery, obtained by forming a layer of the slurry for a porous membrane of a secondary battery according to (5) and drying the formed layer.

(7) A secondary battery comprising the porous membrane for a secondary battery according to (6).

Advantageous Effects of Invention

The binder composition for a porous membrane of a secondary battery according to the present invention has high preservation stability. Moreover, the slurry for the porous membrane for a secondary battery according to the present invention manufactured with the binder composition can be easily applied to easily manufacture a porous membrane for a secondary battery that can provide a secondary battery having improved performance such as high-temperature cycle property.

DESCRIPTION OF EMBODIMENTS

Hereinafter, the present invention will be described in detail by illustrating embodiments and examples. However, the present invention is not limited to the following embodiments and examples, but it may be optionally modified for implementation within the scope not departing from the claims of the present invention and equivalents thereto.

As described herein, the term "(meth)acryl-" means to include one or both of acryl- and methacryl-. For example, (meth)acrylic acid means acrylic acid, methacrylic acid, or a combination thereof. Also, the term "(meth)acrylate" means acrylate, methacrylate, or a combination thereof.

Polycarboxylic acid becomes water-soluble in some cases and water-insoluble in other cases depending on its pH. Therefore, regarding an "aqueous solution" and an "aqueous dispersion liquid" of polycarboxylic acid in the following description, water-insoluble polycarboxylic acid may be dispersed in a so-called "aqueous solution", and water-soluble polycarboxylic acid may be dissolved in a so-called "aqueous dispersion liquid".

<1. Binder Composition for Porous Membrane>

The binder composition for a porous membrane of secondary batteries according to the present invention (hereinafter, may be simply referred to as the "binder composition") includes a specific polycarboxylic acid and water. Hereinafter, this specific polycarboxylic acid may be referred to as a polycarboxylic acid (A).

<1.1. Polycarboxylic Acid (A)>

The polycarboxylic acid (A) is a polymer including a carboxylic acid group-containing monomer unit at a prescribed ratio. The polycarboxylic acid (A) can exert an action of binding non-conductive particles to each other by lying between the non-conductive particles in the porous membrane and an action of binding a non-conductive particle and a separator substrate or a polar plate by lying between the non-conductive particle and the separator substrate or the polar plate.

<1.2.1. Polycarboxylic Acid (A): Carboxylic Acid Group-Containing Monomer Unit>

The carboxylic acid group-containing monomer unit in the polycarboxylic acid (A) is a structural unit having a structure that is formed by polymerization of a carboxylic acid group-containing monomer.

The carboxylic acid group-containing monomer may be a compound having a —COOH group (a carboxylic acid group) and a polymerizable group. Furthermore, for example, a monomer that can generate a carboxylic acid group through hydrolysis may also be used as the carboxylic acid group-containing monomer. Specific examples of the carboxylic acid group-containing monomer may include an acid anhydride that can generate a carboxylic acid group through hydrolysis.

Examples of the carboxylic acid group-containing monomer may include the following ethylenic unsaturated carboxylic acid monomers. Examples of the ethylenic unsaturated carboxylic acid monomers may include an ethylenic unsaturated monocarboxylic acid and a derivative thereof, and an ethylenic unsaturated dicarboxylic acid and an acid anhydride thereof as well as derivatives thereof. Examples of the ethylenic unsaturated monocarboxylic acid may include acrylic acid, methacrylic acid, and crotonic acid. Examples of the derivative of the ethylenic unsaturated monocarboxylic acid may include 2-ethylacrylic acid, isocrotonic acid, α-acetoxyacrylic acid, β-trans-aryloxyacrylic acid, α-chloro-β-E-methoxyacrylic acid, and β-diaminoacrylic acid. Examples of the ethylenic unsaturated dicarboxylic acid may include maleic acid, fumaric acid, and itaconic acid. Examples of the acid anhydride of the ethylenic unsaturated dicarboxylic acid may include maleic anhydride, acrylic anhydride, methylmaleic anhydride, and dimethylmaleic anhydride. Examples of the derivative of the ethylenic unsaturated dicarboxylic acid may include maleic acid having a substituent such as methylmaleic acid, dimethylmaleic acid, phenylmaleic acid, chloromaleic acid, dichloromaleic acid, and fluoromaleic acid; and maleic acid esters such as methyl allyl maleate, diphenyl maleate, nonyl maleate, decyl maleate, dodecyl maleate, octadecyl maleate, and fluoroalkyl maleate. Among these, the ethylenic unsaturated monocarboxylic acid such as acrylic acid and methacrylic acid is preferable, because the dispersibility of the polycarboxylic acid (A) to water can be further enhanced. One type of the ethylenic unsaturated carboxylic acid monomers may be solely used, and two or more types thereof may also be used in combination at any ratio.

The ratio of the carboxylic acid group-containing monomer unit in the polycarboxylic acid (A) is 20% by weight or more, preferably 25% by weight or more, and more preferably 28% by weight or more, and 50% by weight or less, preferably 45% by weight or less, and more preferably 40% by weight or less. When the ratio of the carboxylic acid group-containing monomer unit in the polycarboxylic acid (A) is equal to or more than the aforementioned lower limit, the slurry for a porous membrane can exhibit sufficient viscosity, occurrence of application failure can be reduced, and high high-temperature cycle property can be achieved. When the ratio of the carboxylic acid group-containing monomer unit in the polycarboxylic acid (A) is equal to or less than the aforementioned upper limit, flexibility can be imparted to the porous membrane, and the adhesion strength between the porous membrane and the substrate can be enhanced.

<1.2.2. Polycarboxylic Acid (A): Alkyl (Meth)Acrylate Unit>

The polycarboxylic acid (A) preferably includes an alkyl (meth)acrylate unit. The alkyl (meth)acrylate unit is a structural unit having a structure that is formed by polymerization of an alkyl (meth)acrylate.

Examples of the alkyl (meth)acrylate may include alkyl (meth)acrylate having an alkyl group having 1 to 20 carbon atoms. In particular, the alkyl (meth)acrylate is preferably an alkyl (meth)acrylate having an alkyl group having 1 to 10 carbon atoms, and more preferably an alkyl (meth)acrylate having an alkyl group having 1 to 6 carbon atoms. One type of these alkyl (meth)acrylates or a combination of a plurality of types thereof may be used as the alkyl (meth)acrylate for the polymerization of the polycarboxylic acid (A).

Examples of the alkyl (meth)acrylate may include alkyl acrylates such as methyl acrylate, ethyl acrylate, n-propyl acrylate, isopropyl acrylate, n-butyl acrylate, t-butyl acrylate, pentyl acrylate, hexyl acrylate, heptyl acrylate, octyl acrylate, 2-ethylhexyl acrylate, nonyl acrylate, decyl acrylate, lauryl acrylate, n-tetradecyl acrylate, and stearyl acrylate; and alkyl methacrylates such as methyl methacrylate, ethyl methacrylate, n-propyl methacrylate, isopropyl methacrylate, n-butyl methacrylate, t-butyl methacrylate, pentyl methacrylate, hexyl methacrylate, heptyl methacrylate, octyl methacrylate, 2-ethylhexyl methacrylate, nonyl methacrylate, decyl methacrylate, lauryl methacrylate, n-tetradecyl methacrylate, and stearyl methacrylate. One type thereof may be solely used, and two or more types thereof may also be used in combination at any ratio.

The ratio of the alkyl (meth)acrylate unit in the polycarboxylic acid (A) is preferably 50% by weight or more, more preferably 55% by weight or more, and further more preferably 60% by weight or more. The upper limit of the ratio of the alkyl (meth)acrylate unit in the polycarboxylic acid (A) is 80% by weight or less. When the ratio of the alkyl (meth)acrylate unit in the polycarboxylic acid (A) is equal to or more than the aforementioned lower limit, flexibility can be imparted to the porous membrane, and the adhesion strength between the porous membrane and the substrate can be enhanced.

In a particularly preferable aspect, the polycarboxylic acid (A) includes, as the alkyl (meth)acrylate unit, an alkyl (meth)acrylate unit (U1) having an alkyl group having 1 to 3 carbon atoms and an alkyl (meth)acrylate unit (U2) having an alkyl group having 4 to 6 carbon atoms. Such a combination of the unit (U1) and the unit (U2) enables the binder to have excellent preservation stability. In particular, a combination of ethyl (meth)acrylate and butyl (meth)acrylate is preferable as the monomers that provide the unit (U1) and the unit (U2).

In this case, the weight ratio U1/U2 between the unit (U1) and the unit (U2) in the polycarboxylic acid is preferably 1.0 or more, more preferably 2.0 or more, and further more preferably 2.5 or more, and is preferably 10.0 or less, more preferably 7.0 or less, further more preferably 6.0 or less, and particularly preferably 5.0 or less. When the weight ratio U1/U2 between the unit (U1) and the unit (U2) in the polycarboxylic acid is equal to or more than the aforementioned lower limit, the polycarboxylic acid (A) can be easily solubilized, the slurry for a porous membrane can exhibit sufficient viscosity, occurrence of application failure can be reduced, and high high-temperature cycle property can be achieved. When the weight ratio U1/U2 between the unit (U1) and the unit (U2) in the polycarboxylic acid is equal to or less than the aforementioned upper limit, flexibility can be imparted to the porous membrane, and the adhesion strength between the porous membrane and the substrate can be enhanced.

<1.2.3. Polycarboxylic Acid (A): Crosslinkable Monomer Unit>

The polycarboxylic acid (A) may include a crosslinkable monomer unit. When the crosslinkable monomer unit is included, the molecular weight, physical properties, and the like of the polycarboxylic acid (A) can be adjusted within an appropriate range. The crosslinkable monomer unit is a structural unit having a structure that is formed by polymerization of a crosslinkable monomer. The crosslinkable monomer represents a monomer that can form a crosslinked structure by polymerization. Examples of the crosslinkable monomer may usually include a monomer having thermally crosslinkable property. More specifically, examples thereof may include a monofunctional monomer having one olefinic double bond per molecule and a crosslinkable group having thermally crosslinkable property; and a polyfunctional monomer having two or more olefinic double bonds per molecule.

Examples of the crosslinkable group having thermally crosslinkable property may include an epoxy group, an N-methylol amide group, an oxetanyl group, an oxazoline group, and combinations thereof. Among these, an epoxy group is more preferable, because crosslinking and crosslinking densities can be easily adjusted.

Examples of the crosslinkable monomer having an epoxy group as the crosslinkable group having thermally crosslinkable property and having an olefinic double bond may include unsaturated glycidyl ethers such as vinyl glycidyl ether, allyl glycidyl ether, butenyl glycidyl ether, and o-allylphenyl glycidyl ether; monoepoxides of diene or polyene such as butadiene monoepoxide, chloroprene monoepoxide, 4,5-epoxy-2-pentene, 3,4-epoxy-1-vinylcyclohexane, and 1,2-epoxy-5,9-cyclododecadiene; alkenyl epoxides such as 3,4-epoxy-1-butene, 1,2-epoxy-5-hexene, and 1,2-epoxy-9-decene; and glycidyl esters of unsaturated carboxylic acids such as glycidyl acrylate, glycidyl methacrylate, glycidyl crotonate, glycidyl-4-heptenoate, glycidyl sorbate, glycidyl linoleate, glycidyl-4-methyl-3-pentenoate, a glycidyl ester of 3-cyclohexenecarboxylic acid, and a glycidyl ester of 4-methyl-3-cyclohexenecarboxylic acid.

Examples of the crosslinkable monomer having an N-methylol amide group as a crosslinkable group having thermally crosslinkable property and having an olefinic double bond may include (meth)acrylamide having a methylol group such as N-methylol (meth)acrylamide.

Examples of the crosslinkable monomer having the oxetanyl group as a crosslinkable group having thermally crosslinkable property and having an olefinic double bond may include 3-((meth)acryloyloxymethyl)oxetane, 3-((meth)acryloyloxymethyl)-2-trifluoromethyloxetane, 3-((meth)

acryloyloxymethyl)-2-phenyloxetane, 2-((meth)acryloyloxymethyl)oxetane, and 2-((meth)acryloyloxymethyl)-4-trifluoromethyloxetane.

Examples of the crosslinkable monomer having an oxazoline group as a crosslinkable group having thermally crosslinkable property and having an olefinic double bond may include 2-vinyl-2-oxazoline, 2-vinyl-4-methyl-2-oxazoline, 2-vinyl-5-methyl-2-oxazoline, 2-isopropenyl-2-oxazoline, 2-isopropenyl-4-methyl-2-oxazoline, 2-isopropenyl-5-methyl-2-oxazoline, and 2-isopropenyl-5-ethyl-2-oxazoline.

Examples of the crosslinkable monomer having two or more olefinic double bonds per molecule may include allyl (meth)acrylate, ethylene di(meth)acrylate, diethylene glycol di(meth)acrylate, triethylene glycol di(meth)acrylate, tetraethylene glycol di(meth)acrylate, trimethylol propane-tri(meth)acrylate, dipropylene glycol diallyl ether, polyglycol diallyl ether, triethylene glycol divinyl ether, hydroquinone diallyl ether, tetraallyl oxyethane, trimethylol propane-diallyl ether, allyl or vinyl ether of polyfunctional alcohol other than the aforementioned polyfunctional alcohols, triallylamine, methylenebisacrylamide, and divinyl benzene.

Among these examples, ethylene dimethacrylate, allyl glycidyl ether, and glycidyl methacrylate are particularly preferable as the crosslinkable monomer.

As the crosslinkable monomers and the crosslinkable monomer units, one type thereof may be solely used, and two or more types thereof may also be used in combination at any ratio.

The ratio of the crosslinkable monomer unit in the polycarboxylic acid (A) is preferably 0.1% by weight or more, more preferably 0.2% by weight or more, and further more preferably 0.5% by weight or more, and is preferably 2.0% by weight or less, more preferably 1.5% by weight or less, and further more preferably 1.0% by weight or less. When the ratio of the crosslinkable monomer unit in the polycarboxylic acid (A) is equal to or more than the aforementioned lower limit, the polycarboxylic acid (A) can be prevented from eluting in the battery, and the secondary battery including the porous membrane can achieve high rate property and high high-temperature cycle property. When the ratio of the crosslinkable monomer unit in the polycarboxylic acid (A) is equal to or less than the aforementioned upper limit, flexibility can be imparted to the porous membrane, and the adhesion strength between the porous membrane and the substrate can be enhanced.

<1.2.4. Polycarboxylic Acid (A): Reactive Surfactant Unit>

Furthermore, the polycarboxylic acid (A) preferably includes a reactive surfactant unit. The inclusion of the reactive surfactant unit can enhance the solubility of the polycarboxylic acid (A) to water and the dispersibility of the polycarboxylic acid (A). Here, the reactive surfactant unit is a structural unit having a structure that is obtained by polymerization of a reactive surfactant monomer. The reactive surfactant monomer is a monomer that has a polymerizable group capable of being copolymerized with another monomer and a surface-active group (that is, a hydrophilic group and a hydrophobic group). The reactive surfactant unit obtained by the polymerization of the reactive surfactant monomer can constitute a part of a molecule of the polycarboxylic acid (A), and can function as a surfactant.

Usually, the reactive surfactant monomer has a polymerizable unsaturated group, and this polymerizable unsaturated group acts also as a hydrophobic group after polymerization. Examples of the polymerizable unsaturated group may include a vinyl group, an allyl group, a vinylidene group, a propenyl group, an isopropenyl group, and an isobutylidene group. The number of types of the polymerizable unsaturated groups in one molecule of the polycarboxylic acid (A) may be one, and may also be two or more.

Furthermore, the reactive surfactant monomer usually has a hydrophilic group as a moiety that exhibits hydrophilicity. The reactive surfactant monomer is classified into anionic, cationic, and nonionic surfactants, on the basis of the type of the hydrophilic group.

Examples of the anionic hydrophilic group may include —$SO_3M$, —COOM, and —$PO(OM)_2$. Here, M indicates a hydrogen atom or a cation. Examples of the cation may include ions of alkali metals such as lithium, sodium, and potassium; ions of alkaline earth metals such as calcium and magnesium; an ammonium ion; ammonium ions of alkylamines such as monomethylamine, dimethylamine, monoethylamine, and triethylamine; and ammonium ions of alkanolamines such as monoethanolamine, diethanolamine, and triethanolamine.

Examples of the cationic hydrophilic group may include primary amine salts such as —$NH_2HX$, secondary amine salts such as —$NHCH_3HX$, tertiary amine salts such as —$N(CH_3)_2HX$, and quaternary amine salts such as —$N^+(CH_3)_3X^-$. Here, X represents a halogen group.

Examples of the nonionic hydrophilic group may include —OH.

Examples of the suitable reactive surfactant may include a compound represented by the following formula (II).

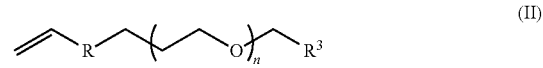

(II)

In the formula (II), R represents a divalent bonding group. Examples of R may include a —Si—O— group, a methylene group, and a phenylene group.

In the formula (II), $R^3$ represents a hydrophilic group. Examples of $R^3$ may include —$SO_3NH_4$.

In the formula (II), n represents an integer of 1 or more and 100 or less.

Another example of the suitable reactive surfactant may include a compound having a structural unit having a structure that is formed by polymerization of ethylene oxide and a structural unit having a structure that is formed by polymerization of butylene oxide, and further having, at a terminal, an alkenyl group containing a terminal double bond and —$SO_3NH_4$ (for example, trade name "Latemul PD-104" and "Latemul PD-105", manufactured by Kao Corporation).

One type of the reactive surfactants or the reactive surfactant units may be solely used, and two or more types thereof may also be used in combination at any ratio.

The content ratio of the reactive surfactant unit in the polycarboxylic acid (A) is usually 0.1% by weight or more, preferably 0.2% by weight or more, and more preferably 0.5% by weight or more, and is usually 15% by weight or less, preferably 10% by weight or less, and more preferably 5% by weight or less. When the ratio of the reactive surfactant unit is equal to or more than the lower limit of the aforementioned range, the polycarboxylic acid (A) can have improved dispersibility, whereby a uniform porous membrane can be obtained. On the other hand, when the ratio of the reactive surfactant unit is equal to or less than the upper limit of the aforementioned range, the moisture content in the porous membrane can be kept low, whereby durability of the porous membrane of the present invention can be improved.

<1.2.5. Polycarboxylic Acid (A): Other Units>

The polycarboxylic acid (A) may include a structural unit other than the aforementioned units, as long as the effects of the present invention are not significantly impaired. Such a structural unit may be a structural unit that is formed by polymerization of a monomer that is copolymerizable with the aforementioned monomer. One type thereof may be solely used, and two or more types thereof may also be used in combination at any ratio. For example, the polycarboxylic acid (A) may include a fluorine-containing (meth)acrylic acid ester monomer unit. However, from the viewpoint of performing good application of the slurry for a porous membrane onto the substrate, the ratio of the fluorine-containing (meth)acrylic acid ester monomer unit in the polycarboxylic acid (A) is preferably less than 1% by weight.

<1.2.6. Polycarboxylic Acid (A): Physical Properties and Others>

Since a polycarboxylic acid generally has a carboxylic acid group, it tends to exhibit high water solubility in an aqueous solution having a high pH, and to exhibit low water solubility in an aqueous solution having a low pH. The polycarboxylic acid (A) according to the present invention is water-insoluble at a pH of 6.5 or less, and water-soluble at a pH of 8 or more.

The lower limit of the pH range in which water insolubility is exhibited can be, but not particularly limited to, for example, 1.0 or more. The upper limit of the pH range in which water solubility is exhibited can also be, but not particularly limited to, for example, 12.0 or less.

Whether the polycarboxylic acid (A) is water-soluble or water-insoluble at pH 6.5 and pH 8 is determined in the following manner.

First, there are prepared an aqueous solution of the polycarboxylic acid (A) having a concentration of 10% and a pH of 6.5, and an aqueous solution of the polycarboxylic acid (A) having a concentration of 10% and a pH of 8.0. Each of the prepared aqueous solutions is stirred at 25° C. for one hour to obtain an evaluation liquid.

The evaluation liquid is poured into a cell having an optical path length of 30 mm, and the scattered light and total transmitted light are measured using a haze meter. Then, the haze of the evaluation liquid is calculated by formula: haze=scattered light/total transmitted light×100 (%). When the haze of the evaluation liquid is 60% or more, the polycarboxylic acid (A) is determined as being water-insoluble, and when the haze of the evaluation liquid is less than 60%, the polycarboxylic acid (A) is determined as being water-soluble.

The haze of the aforementioned aqueous solution of the polycarboxylic acid (A) at pH 6.5 is preferably 70% or more, and more preferably 80% or more. The use of the polycarboxylic acid (A) presenting such a high haze at pH 6.5 or less, that is, presenting high water insolubility, inhibits aggregation when the binder composition is prepared. Therefore, preparation and preservation of the binder composition become easy. In particular, when a particulate polymer is added as an optional component to the binder composition, aggregation can be prevented, and favorable preparation can be achieved. The upper limit of the haze of the aqueous solution at pH 6.5 may be, but not particularly limited to, for example, 100% or less.

On the other hand, the haze of the aforementioned aqueous solution of the polycarboxylic acid (A) at pH 8.0 is preferably less than 50%, and more preferably less than 40%. The use of the polycarboxylic acid (A) expressing such a low haze at pH 8.0, that is, expressing high water solubility, enables the slurry for a porous membrane to exhibit sufficient viscosity, and reduces occurrence of application failure. Thus, the secondary battery including the porous membranes can achieve high rate property and high high-temperature cycle property. The lower limit of the haze of the aqueous solution at pH 8.0 may be, but not particularly limited to, for example, 0% or more.

Furthermore, use of the polycarboxylic acid (A) having both of the property in the aqueous solution at pH 6.5 and the property in the aqueous solution at pH 8.0 enables the binder composition to enjoy both advantages of high preservation stability and appropriate viscosity in use. The polycarboxylic acid (A) having such properties may be obtained by appropriately adjusting the ratio of the carboxylic acid group-containing monomer unit, and the ratios, types, and the like of other monomer units.

The weight average molecular weight of the polycarboxylic acid (A) is preferably 20,000 or more, more preferably 50,000 or more, and particularly preferably 100,000 or more, and is preferably 500,000 or less, and more preferably 250,000 or less. When the weight average molecular weight of the polycarboxylic acid (A) is equal to or more than the lower limit of the aforementioned range, the strength of the polycarboxylic acid (A) can be enhanced to form a stable porous membrane. Therefore, for example, the dispersibility of a non-conductive particle and the high-temperature preservation property of a secondary battery can be improved. Furthermore, when the weight average molecular weight of the polycarboxylic acid (A) is equal to or less than the upper limit of the aforementioned range, the polycarboxylic acid (A) can be softened. Therefore, for example, adhesion of the porous membrane according to the present invention to the substrate can be improved. Here, the weight average molecular weight of the polycarboxylic acid (A) may be obtained by GPC (gel permeation chromatography) as a value in terms of polyethylene oxide using as a developing solvent a solution of 0.85 g/ml of sodium nitrate dissolved in a 10% by volume aqueous solution of acetonitrile.

The glass transition temperature of the polycarboxylic acid (A) is preferably −50° C. or higher, more preferably −30° C. or higher, and further more preferably −10° C. or higher, and is preferably lower than 30° C., more preferably 25° C. or lower, and further more preferably 20° C. or lower. When the glass transition temperature of the polycarboxylic acid (A) is equal to or more than the aforementioned lower limit, the polycarboxylic acid (A) can be easily solubilized, the slurry for a porous membrane can exhibit sufficient viscosity, occurrence of application failure can be reduced, and the secondary battery including the porous membrane can achieve high high-temperature cycle property. When the glass transition temperature of the polycarboxylic acid (A) is equal to or lower than the aforementioned upper limit, flexibility can be imparted to the porous membrane, and the adhesion strength between the porous membrane and a substrate can be enhanced.

<1.2.7. Polycarboxylic Acid (A): Manufacturing Method>

Examples of the manufacturing method of the polycarboxylic acid (A) may include, but not particularly limited to, polymerizing in an aqueous solvent a monomer composition containing the aforementioned monomers. At this time, the ratio of each monomer in the monomer composition is usually set to the same ratio as that of each structural unit in the polycarboxylic acid (A).

Examples of the aqueous solvent may include water; ketones such as diacetone alcohol and γ-butyrolactone; alcohols such as ethyl alcohol, isopropyl alcohol, and normal propyl alcohol; glycol ethers such as propylene glycol monomethyl ether, methyl cellosolve, ethyl cellosolve, ethylene glycol tertiary butyl ether, butyl cellosolve, 3-methoxy-3-methyl-1-butanol, ethylene glycol monopropyl ether, diethylene glycol monobutyl ether, triethylene glycol monobutyl ether, and dipropylene glycol monomethyl ether; and ethers such as 1,3-dioxolane, 1,4-dioxolane, and tetrahydrofuran. Among these, water is particularly preferable because it is not combustible. Furthermore, the aforementioned aqueous solvent other than water may be used together with water as a main solvent.

Examples of the polymerization method may include, but not particularly limited to, a solution polymerization method, a suspension polymerization method, a bulk polymerization method, and an emulsion polymerization method. Examples of the polymerization method to be used may include ion polymerization, radical polymerization, and living radical polymerization.

Accordingly, there is usually obtained an aqueous dispersion liquid in which the polycarboxylic acid (A) is dispersed in an aqueous solvent. Although the polycarboxylic acid (A) may be extracted from the aqueous dispersion liquid obtained in this manner, the polycarboxylic acid (A) in the state of being dispersed in an aqueous solvent may be usually used to manufacture the binder for porous membranes, and the manufactured binder may be used to manufacture the slurry for a porous membrane and the porous membrane.

The aqueous dispersion liquid of the polycarboxylic acid (A) obtained as a result of a polymerization reaction is usually acidic, and therefore it may be adjusted to increase the pH as necessary before being used in the next step.

When the pH is adjusted, the pH of the aqueous dispersion liquid of the polycarboxylic acid (A) is preferably 3.0 or more, more preferably 3.2 or more, and further more preferably 3.5 or more, and is preferably 6.5 or less. When the aqueous dispersion liquid of the polycarboxylic acid (A) has an excessively low pH, aggregation easily occurs when other materials are mixed and the pH rapidly increases. When the aqueous dispersion liquid of the polycarboxylic acid (A) has an excessively high pH, the polycarboxylic acid (A) is dissolved and aggregation easily occurs in mixing with the particulate polymer. Therefore, a favorable slurry for a porous membrane can be obtained by adjusting the pH within an appropriate range.

Examples of the method for increasing the pH may include a method of adding an alkaline aqueous solution. Examples of a basic component constituting the alkaline aqueous solution may include ammonia (ammonium hydroxide); a hydroxide of alkali metal such as lithium hydroxide, sodium hydroxide, and potassium hydroxide; and a hydroxide of alkaline earth metal such as calcium hydroxide and magnesium hydroxide. One type of the aforementioned alkaline aqueous solutions may be solely used, and two or more thereof may also be used in combination at any ratio.

<1.3. Particulate Polymer>

The binder composition according to the present invention may include a particulate polymer in addition to the polycarboxylic acid (A). The inclusion of the particulate polymer in the binder composition and the slurry for a porous membrane usually provides the following advantages. That is, the binding property of the porous membrane improves, and the strength against mechanical forces applied to a separator or an electrode including the porous membrane for a secondary battery according to the present invention during handling such as winding and transportation can be enhanced. Furthermore, since the particulate polymer is in a shape of particles, binding thereof to the non-conductive particles in the porous membrane is effected not over an area but at a point. This enables pores in the porous membrane to increase in size, thereby allowing the secondary battery to have reduced internal resistance.

The particulate polymer is usually water-insoluble. Therefore, the particulate polymer does not dissolve at least in the binder composition and the slurry for a porous membrane, but the particulate polymer can exist therein in a state of being dispersed while keeping a shape of particles. The particulate polymer can exist in the porous membrane with a part or all of the shape of particles maintained. Such a particulate polymer may be obtained by appropriately adjusting the ratio of each monomer unit that is a component.

The particulate polymer may contain a (meth)acrylic acid ester monomer unit. The (meth)acrylic acid ester monomer unit is a structural unit having a structure that is formed by polymerization of a (meth)acrylic acid ester monomer. Since the (meth)acrylic acid ester monomer unit has high strength, the molecule of the particulate polymer can be stabilized.

Examples of the (meth)acrylic acid ester monomer may include acrylic acid alkyl esters such as methyl acrylate, ethyl acrylate, n-propyl acrylate, isopropyl acrylate, n-butyl acrylate, t-butyl acrylate, pentyl acrylate, hexyl acrylate, heptyl acrylate, octyl acrylate, 2-ethylhexyl acrylate, nonyl acrylate, decyl acrylate, lauryl acrylate, n-tetradecyl acrylate, and stearyl acrylate; and methacrylic acid alkyl esters such as methyl methacrylate, ethyl methacrylate, n-propyl methacrylate, isopropyl methacrylate, n-butyl methacrylate, t-butyl methacrylate, pentyl methacrylate, hexyl methacrylate, heptyl methacrylate, octyl methacrylate, 2-ethylhexyl methacrylate, nonyl methacrylate, decyl methacrylate, lauryl methacrylate, n-tetradecyl methacrylate, and stearyl methacrylate. As the (meth)acrylic acid ester monomers and the (meth)acrylic acid ester monomer units, one type thereof may be solely used, and two or more types thereof may also be used in combination at any ratio.

The ratio of the (meth)acrylic acid ester monomer unit in the particulate polymer is preferably 50% by weight or more, more preferably 55% by weight or more, and particularly preferably 58% by weight or more, and is preferably 98% by weight or less, more preferably 97% by weight or less, and particularly preferably 96% by weight or less. When the ratio of the (meth)acrylic acid ester monomer unit in the particulate polymer is equal to or more than the lower limit of the aforementioned range, binding property between the porous membrane and a separator substrate or a polar plate can be improved. When the ratio of the (meth)acrylic acid ester monomer unit in the particulate polymer is equal to or less than the upper limit, flexibility of the porous membrane can be improved.

The particulate polymer may include the crosslinkable monomer unit used in the aforementioned polycarboxylic acid (A). In particular, it is preferable that the particulate polymer includes a monomer unit containing an N-methylol amide group.

Examples of the monomer unit containing an N-methylol amide group may include N-methylol (meth)acrylamide.

When the monomer unit containing an N-methylol amide group is used, it is preferable to co-use acrylamide of primary amine such as (meth)acrylamide.

The ratio of the aforementioned acrylamide monomer unit of primary amine is preferably 50% by weight or more and 200% by weight or less relative to the ratio of the acrylamide monomer unit having an N-methylol group. When the aforementioned range is satisfied, the particulate polymer is inhibited from eluting into an electrolytic solution, and favorable battery properties can be obtained.

In this case, acrylamide of primary amine is included in the crosslinkable monomer unit.

The ratio of the crosslinkable monomer unit in the particulate polymer is preferably 0.5% by weight or more, and more preferably 1.0% by weight or more, and is preferably 5% by weight or less, more preferably 4.5% by weight or less, and further more preferably 4.0% by weight or less. When the ratio of the crosslinkable monomer unit in the particulate polymer is equal to or more than the aforementioned lower limit, affinity between the porous membrane and the substrate can be enhanced thereby to enhance the adhesion strength between the porous membrane and the substrate. When the ratio of the crosslinkable monomer unit in the particulate polymer is equal to or less than the aforementioned upper limit, generation of a large amount of particles having a small particle size can be prevented during the polymerization of the particulate polymer. This can reduce occurrences of clogging in a separator during the use of the battery. As a result, high high-temperature cycle property can be achieved.

The particulate polymer may include an acid group-containing monomer unit. The acid group-containing monomer unit in the particulate polymer is a structural unit having a structure that is formed by polymerization of an acid group-containing monomer. The acid group-containing monomer is a monomer containing an acid group. Therefore, the particulate polymer having the acid group-containing monomer unit contains an acid group.

Examples of the acid group that may be contained in the particulate polymer may include a —COOH group (carboxylic acid group); a —$SO_3H$ group (sulfonic acid group); a phosphonic acid group such as a —$PO_3H_2$ group and a —PO(OH)(OR) group (R represents a hydrocarbon group); and combinations thereof. Therefore, examples of the acid group-containing monomer may include monomers having these acid groups. Further examples of the acid group-containing monomer may include monomers that can generate the aforementioned acid groups through hydrolysis. Specific examples of such an acid group-containing monomer may include an acid anhydride that can generate a carboxylic acid group through hydrolysis.

Examples of the monomer having a carboxylic acid group (a carboxylic acid monomer) may include a monocarboxylic acid, a dicarboxylic acid, an anhydride of a dicarboxylic acid, and derivatives thereof. Examples of the monocarboxylic acid may include acrylic acid, methacrylic acid, crotonic acid, 2-ethylacrylic acid, and isocrotonic acid. Examples of the dicarboxylic acid may include maleic acid, fumaric acid, itaconic acid, and methylmaleic acid. Examples of the acid anhydride of dicarboxylic acid may include maleic anhydride, acrylic anhydride, methylmaleic anhydride, and dimethylmaleic anhydride. Among these, the monocarboxylic acid is preferable, and acrylic acid and methacrylic acid are more preferable.

Furthermore, salts of the aforementioned monomers may be used as the acid group-containing monomer. Examples of such salts may include sodium salts of a styrenesulfonic acid such as p-styrenesulfonic acid.

As the acid group-containing monomers and the acid group-containing monomer units, one type thereof may be solely used, and two or more thereof may also be used in combination at any ratio.

Although an acid group may be introduced through polymerization of the aforementioned acid group-containing monomers, an acid group may also be introduced by polymerizing a particulate polymer that does not have an acid group and then substituting a part or all of functional groups in the particulate polymer with an acid group. A repeating unit in the particulate polymer having the acid group that has been introduced in this manner is also included in the acid group-containing monomer unit.

The ratio of the acid group-containing monomer unit in the particulate polymer is preferably 0.1% by weight or more, more preferably 0.2% by weight or more, and particularly preferably 0.5% by weight or more, and is preferably 50% by weight or less, more preferably 20% by weight or less, and particularly preferably 10% by weight or less. When the ratio of the acid group-containing monomer unit in the particulate polymer is equal to or more than the lower limit of the aforementioned range, binding property between the porous membrane and a separator substrate or a polar plate can be effectively improved. When the ratio of the acid group-containing monomer unit in the particulate polymer is equal to or less than the upper limit, durability of the porous membrane can be enhanced.

Furthermore, the particulate polymer may contain an optional structural unit other than the aforementioned structural units. Examples of the optional structural units that may be contained in the particulate polymer may include structural units having structures that are formed by polymerization of the following monomers. That is, the examples may include a structural unit having a structure that is formed by polymerization of one or more of: aliphatic conjugated diene monomers such as 1,3-butadiene, 2-methyl-1,3-butadiene, 2,3-dimethyl-1,3-butadiene, and 2-chlor-1,3-butadiene; aromatic vinyl monomers such as styrene, chlorostyrene, vinyltoluene, t-butylstyrene, vinylbenzoic acid, methyl vinylbenzoate, vinylnaphthalene, chloromethylstyrene, hydroxymethylstyrene, α-methylstyrene, and divinylbenzene; α,β-unsaturated nitrile compound monomers such as acrylonitrile, methacrylonitrile, α-chloracrylonitrile, and α-ethylacrylonitrile; olefin monomers such as ethylene and propylene; halogen atom-containing monomers such as vinyl chloride and vinylidene chloride; vinyl ester monomers such as vinyl acetate, vinyl propionate, vinyl butyrate, and vinyl benzoate; vinyl ether monomers such as methyl vinyl ether, ethyl vinyl ether, and butyl vinyl ether; vinyl ketone monomers such as methyl vinyl ketone, ethyl vinyl ketone, butyl vinyl ketone, hexyl vinyl ketone, and isopropenyl vinyl ketone; and heterocyclic ring-containing vinyl compound monomers such as N-vinylpyrrolidone, vinylpyridine, and vinylimidazole. As one type thereof may be solely used, and two or more types thereof may also be used in combination at any ratio.

As the particulate polymers, one type thereof may be solely used, and two or more types thereof may also be used in combination at any ratio.

The weight average molecular weight of the particulate polymer is preferably 10,000 or more, and more preferably 20,000 or more, and is preferably 1,000,000 or less, and more preferably 500,000 or less. When the weight average molecular weight of the polymer constituting the particulate polymer falls within the aforementioned range, the strength of the porous membrane and the dispersibility of non-conductive particles are likely to be favorable. Here, the weight average molecular weight of the polymer constituting the particulate polymer may be obtained by gel permeation chromatography (GPC) as a polystyrene equivalent value using tetrahydrofuran as a developing solvent.

The glass transition temperature of the particulate polymer is preferably −75° C. or higher, more preferably −55° C.

or higher, and particularly preferably −45° C. or higher, and is preferably 40° C. or lower, more preferably 30° C. or lower, further more preferably 20° C. or lower, and particularly preferably 15° C. or lower. When the glass transition temperature of the particulate polymer falls within the aforementioned range, a balance is highly and suitably achieved among the properties such as the flexibility and winding property of a separator including the porous membrane and an electrode as well as binding property between the porous membrane and the separator substrate or the polar plate. The glass transition temperature of the particulate polymer may be adjusted by, for example, combining a variety of monomers.

The volume average particle size D50 of the particulate polymer is preferably 0.01 μm or more, more preferably 0.05 μm or more, and further more preferably 0.1 μm or more, and is preferably 1.0 μm or less, more preferably 0.8 μm or less, and further more preferably 0.5 μm or less. When the volume average particle size of the particulate polymer falls within the aforementioned range, the porous membrane can have good strength and flexibility.

When the binder composition for a porous membrane according to the present invention includes the particulate polymer, the ratio between the particulate polymer and the polycarboxylic acid (A) in the binder composition for a porous membrane may be appropriately set such that the ratio between the particulate polymer and the polycarboxylic acid (A) in the obtained slurry for a porous membrane falls within a desired range. For example in the manufacture of the slurry for a porous membrane, when all of the polycarboxylic acid (A) and the particulate polymer are supplied by adding the binder composition for a porous membrane, the ratio between the particulate polymer and the polycarboxylic acid (A) in the binder composition for a porous membrane is preferably the same as a preferable ratio between the particulate polymer and the polycarboxylic acid (A) in the obtained slurry for a porous membrane. Preferably, particulate polymer:polycarboxylic acid (A)=99:1 to 50:50, more preferably, particulate polymer:polycarboxylic acid (A)=99:1 to 70:30, and further more preferably, particulate polymer:polycarboxylic acid (A)=99:1 to 80:20.

When the ratio of the polycarboxylic acid (A) relative to the particulate polymer in the slurry for a porous membrane is equal to or more than the aforementioned lower limit, the slurry for a porous membrane can exhibit sufficient viscosity, occurrence of application failure can be reduced, and high high-temperature cycle property can be achieved. On the other hand, when the ratio of the polycarboxylic acid (A) relative to the particulate polymer in the slurry for a porous membrane is equal to or less than the aforementioned upper limit, the viscosity can be prevented from increasing excessively, the application with less application unevenness can be achieved, and high high-temperature cycle property can be achieved. Therefore, when the ratio between the particulate polymer and the polycarboxylic acid (A) in the binder composition for a porous membrane falls within this range, a preferable slurry composition for a porous membrane can be easily prepared.

The particulate polymer may be manufactured by, for example, polymerizing a monomer composition containing the aforementioned monomers in an aqueous solvent. The content ratio of each monomer in the monomer composition in the polymerization reaction is usually set to be the same content ratio as that of a repeating unit in a desired particulate polymer.

As the aqueous solvent, an aqueous solvent in which the particulate polymer can be dispersed in a particle state may be selected. The aqueous solvent may be selected from aqueous solvents having a boiling point at normal pressure of preferably 80 to 350° C., and more preferably 100 to 300° C.

Examples of the aqueous solvent may include water; ketones such as diacetone alcohol and γ-butyrolactone; alcohols such as ethyl alcohol, isopropyl alcohol, and normal propyl alcohol; glycol ethers such as propylene glycol monomethyl ether, methyl cellosolve, ethyl cellosolve, ethylene glycol tertiary butyl ether, butyl cellosolve, 3-methoxy-3-methyl-1-butanol, ethylene glycol monopropyl ether, diethylene glycol monobutyl ether, triethylene glycol monobutyl ether, and dipropylene glycol monomethyl ether; and ethers such as 1,3-dioxolane, 1,4-dioxolane, and tetrahydrofuran. Among these, water is particularly preferable, because water is not combustible, and a dispersion of particles of the particulate polymer can be easily obtained. The aforementioned aqueous solvents other than water may be used together with water used as a main solvent, as long as the dispersion state of the particles of the particulate polymer can be ensured.

Examples of the polymerization method may include, but not particularly limited to, a solution polymerization method, a suspension polymerization method, a bulk polymerization method, and an emulsion polymerization method. The reaction form of polymerization may be any one of ion polymerization, radical polymerization, and living radical polymerization. Among these, the emulsion polymerization method is particularly preferable from the viewpoint of manufacturing efficiency. For example, a high-molecular weight body is easily obtained. Furthermore, since a polymer is obtained in a state of being dispersed in water as it is, a re-dispersion treatment is not necessary, and the obtained polymer can be used as it is for the manufacture of the binder composition for a porous membrane according to the present invention. The emulsion polymerization may be performed in accordance with a method known per se in the art.

As additives such as emulsifiers, dispersants, polymerization initiators, and polymerization auxiliaries used in the polymerization, commonly used additives may be used. The amounts of these additives for use may also be commonly used amounts. The polymerization conditions may be appropriately adjusted depending on the types of the polymerization method and the polymerization initiator, and the like.

<1.4. Water and Other Components>

The binder composition according to the present invention includes water. Water functions as a medium, that is, a solvent or a dispersion medium, in the binder composition. Usually in the binder composition, the non-conductive particle and the particulate polymer are usually dispersed in water. On the other hand, the polycarboxylic acid is dissolved or dispersed in water depending on the pH of the binder composition.

As the medium, a combination of a medium other than water and water may also be used. Examples of the medium that may be used in combination with water may include cyclic aliphatic hydrocarbon compounds such as cyclopentane and cyclohexane; aromatic hydrocarbon compounds such as toluene and xylene; ketone compounds such as ethyl methyl ketone and cyclohexanone; ester compounds such as ethyl acetate, butyl acetate, γ-butyrolactone, and ε-caprolactone; nitrile compounds such as acetonitrile and propionitrile; ether compounds such as tetrahydrofuran and ethylene glycol diethyl ether; alcohol compounds such as methanol, ethanol, isopropanol, ethylene glycol, and ethylene glycol monomethyl ether; and amide compounds such as N-methylpyrrolidone (NMP) and N,N-dimethylformamide. One type thereof may be solely used, and two or more types thereof may also be used in combination at any ratio. The amount of the medium other than water relative to 100 parts by weight of water is preferably 5 parts by weight or less.

The amount of the solvent in the binder composition is preferably set such that the solid content concentration of the binder composition falls within a desired range. The specific solid content concentration of the binder composition is preferably 10% by weight or more, more preferably 15% by weight or more, and further more preferably 20% by weight or more, and is preferably 80% by weight or less, more preferably 75% by weight or less, further more preferably 70% by weight or less, and particularly preferably 65% by weight or less. As described herein, the solid content of a composition refers to a substance that remains after the composition is dried. When the solid content concentration is equal to or more than the aforementioned lower limit, a slurry for a porous membrane having a suitable concentration can be easily manufactured. Moreover, water can be easily removed during manufacture of the porous membrane using the slurry, whereby the moisture content in the porous membrane can be reduced. When the solid content concentration is equal to or less than the aforementioned upper limit, a slurry for a porous membrane suitable for application can be easily manufactured.

The binder composition according to the present invention may further include acidic and/or basic components for adjusting the pH. Examples of such acidic and basic components may include hydrogen chloride; ammonia (ammonium hydroxide); hydroxides of alkali metal such as lithium hydroxide, sodium hydroxide, and potassium hydroxide; and hydroxides of alkaline earth metal such as calcium hydroxide and magnesium hydroxide.

<1.5. Physical Properties of Binder Composition>

The pH of the binder composition for a porous membrane according to the present invention is 6.5 or lower. The lower limit of the pH is preferably 5.0 or higher, more preferably 5.2 or higher, and further preferably 5.5 or higher. When the pH of the binder composition for a porous membrane is equal to or higher than the aforementioned lower limit, the stability of the polycarboxylic acid (A) is improved, and aggregation during preservation can be suppressed. Moreover, when a porous membrane is formed, adhesion strength between the porous membrane and a substrate can be enhanced. When the pH of the binder composition for a porous membrane is equal to or lower than the aforementioned upper limit, the polycarboxylic acid (A) is maintained in a water-insoluble state, aggregation during preservation can be suppressed, and a highly stable binder composition can be obtained. The pH of the binder composition for a porous membrane can be adjusted by adding an aqueous solution containing an acidic or basic component.

<1.6. Manufacturing Method of Binder Composition>

The preparation method of the binder composition for a porous membrane according to the present invention is not particularly limited. However, for example, the binder composition according to the present invention may be manufactured by the aforementioned method or the like by polymerizing a monomer to form the polycarboxylic acid (A) in an aqueous solvent thereby preparing an aqueous dispersion liquid of the polycarboxylic acid (A). The aqueous dispersion liquid as it is may be used as the binder composition for a porous membrane according to the present invention, or the binder composition for a porous membrane according to the present invention may be obtained by adjusting the pH of the aqueous dispersion liquid within the aforementioned preferable range as necessary. Alternatively, the binder composition for a porous membrane according to the present invention may also be obtained by further adding the aforementioned optional components to the aqueous dispersion liquid as necessary and then adjusting the pH within the aforementioned range.

<2. Slurry for Porous Membrane>

The slurry for a porous membrane of a secondary battery according to the present invention includes a non-conductive particle, the polycarboxylic acid (A), and water.

<2.1. Non-Conductive Particle>

The non-conductive particle is a component that is filled in a porous membrane, and spaces between these non-conductive particles may form pores of the porous membrane. The non-conductive particle has non-conductivity, thereby allowing the porous membrane to become non-conductive. Therefore, a short circuit in the secondary battery can be prevented. Furthermore, the non-conductive particle usually has high rigidity, thereby enabling the porous membrane to have enhanced mechanical strength. Therefore, even when heat causes a stress that forces a substrate such as a separator substrate to shrink, the porous membrane can resist the stress. Consequently, a short circuit due to the shrinkage of a substrate can be prevented.

For the non-conductive particle, an inorganic particle or an organic particle may be used.

An inorganic particle is usually excellent in dispersion stability in water, and is unlikely to precipitate in the slurry for a porous membrane, so that a uniform slurry state can be maintained for an extended period. Furthermore, the use of an inorganic particle usually enables the porous membrane to have enhanced heat resistance.

As a material of the non-conductive particle, an electrochemically stable material is preferable. From such a viewpoint, preferable examples of the inorganic material of the non-conductive particle may include particles of oxide such as aluminum oxide (alumina), a hydrate of aluminum oxide (boehmite (AlOOH), gibbsite ($Al(OH)_3$)), bakelite, iron oxide, silicon oxide, magnesium oxide (magnesia), magnesium hydroxide, calcium oxide, titanium oxide (titania), $BaTiO_3$, ZrO, and alumina-silica composite oxide; particles of nitride such as aluminum nitride, silicon nitride, and boron nitride; particles of covalent crystal such as silicon and diamond; particles of poorly-soluble ionic crystal such as barium sulfate, calcium fluoride, and barium fluoride; and clay fine particles such as silica, talc, and montmorillonite. Among these, from the viewpoint of low water absorbability and excellent heat resistance (for example, resistance to a high temperature of 180° C. or higher), alumina, boehmite, and barium sulfate are preferable.

As the organic particle, a particle of a polymer is usually used. By adjusting the type and amount of a functional group on the surface of the organic particle, affinity of the organic particle to water can be controlled, and thus the content of moisture in the porous membrane can be controlled. Furthermore, the organic particle is usually excellent in reduced elution of metal ions.

Examples of the polymer that forms the non-conductive particle may include a variety of polymer compounds such as polystyrene, polyethylene, polyimide, a melamine resin, a phenolic resin, and an acrylic resin. The aforementioned polymer compounds that form the particle may be a homopolymer or a copolymer. In the case of a copolymer, any of a block copolymer, a random copolymer, a graft copolymer, and an alternating copolymer may be used. Furthermore, the polymer compounds may be partly modified or crosslinked. A mixture thereof may also be used. In a case of a crosslinked copolymer, examples of crosslinking agent may include a crosslinking body having an aromatic ring such as divinyl benzene, a multifunctional acrylate crosslinking body such as ethylene glycol dimethacrylate, and a crosslinking body having an epoxy group such as glycidyl acrylate and glycidyl methacrylate.

When an organic particle is used as a non-conductive particle, usually the organic particle is a particle of a polymer that does not have a glass transition temperature or a particle of a polymer that has a high glass transition temperature. When the polymer has a glass transition temperature, the glass transition temperature is preferably 150° C. or higher, more preferably 200° C. or higher, and particularly preferably 250° C. or higher, and is usually 500° C. or lower.

The manufacturing method of the organic particle as the non-conductive particle is not particularly limited, and examples thereof may include a solution polymerization method, a suspension polymerization method, and an emulsion polymerization method. Among these, an emulsion polymerization method and a suspension polymerization method are preferable, since polymerization can be performed in water and the obtained product as it is can be used as a material of the slurry for a porous membrane. When manufacturing the organic particle, the reaction system thereof preferably contains a dispersant. Although the organic particle usually is formed from a polymer that substantially constitutes the organic particle, it may be accompanied with an optional component such as an additive that has been added in polymerization.

The non-conductive particle may be subjected to, for example, element substitution, surface treatment, and solid solution formation, as necessary. With regard to the non-conductive particle, one particle may solely contain one of the aforementioned materials, and one particle may also contain two or more in combination at any ratio in one particle. Furthermore, the non-conductive particle to be used may be a combination of two or more types of particles formed of materials different from each other.

The non-conductive particle may have a shape of, for example, a sphere, an ellipse, a polygon, tetrapod (registered trademark), a plate, and a scale.

The volume average particle size of the non-conductive particle is preferably 0.1 μm or more, and more preferably 0.2 μm or more, and is preferably 5 μm or less, and more preferably 1 μm or less. When the volume average particle size of the non-conductive particle is equal to or more than the lower limit of the aforementioned range, dispersibility of the non-conductive particle in the porous membrane can be enhanced, and thus a porous membrane having excellent uniformity can be obtained. When the volume average particle size of the non-conductive particle is equal to or less than the upper limit of the aforementioned range, a porous membrane having excellent durability can be obtained. Here, the volume average particle size of a particle is a particle size at which a cumulative volume calculated from the small diameter side becomes 50% in a particle size distribution measured by a laser diffraction method.

The BET specific surface area of the non-conductive particle is, for example, 0.9 $m^2/g$ or more, and preferably 1.5 $m^2/g$ or more. From the viewpoint of inhibiting aggregation of the non-conductive particle and obtaining the slurry for a porous membrane having suitable fluidity, the BET specific surface area is preferably not extremely large, and is preferably, for example, 150 $m^2/g$ or less.

The ratio of the non-conductive particle in the slurry for a porous membrane of a secondary battery according to the present invention, relative to the polycarboxylic acid (A), may be appropriately set such that favorable effects of the polycarboxylic acid (A) are exhibited. Specifically, the ratio of the polycarboxylic acid (A) relative to 100 parts by weight of the non-conductive particle is preferably 0.1 parts by weight or more, and more preferably 0.2 parts by weight or more, and is preferably 10 parts by weight or less, and more preferably 5 parts by weight or less.

<2.2. Water and Other Media>

The slurry for a porous membrane according to the present invention includes water. As a medium, a combination of a medium other than water and water may be used. Examples of the medium that can be used in combination with water and examples of the ratio between the medium and water may be the same as those for the medium in the binder composition. The amount of water in the slurry for a porous membrane is not particularly limited, and may be appropriately adjusted such that the physical properties of the slurry for a porous membrane fall within a preferable range.

<2.3. Optional Components>

The slurry for a porous membrane according to the present invention may include optional components other than the aforementioned components. As such optional components, a component that does not have excessively undesirable influence on battery reactions may be used. As the optional components, one type thereof may be solely used, and two or more thereof may also be used in combination at any ratio.

For example, the slurry for a porous membrane according to the present invention may include a water-soluble thickener other than the polycarboxylic acid (A). The water-soluble thickener to be used is preferably carboxymethyl cellulose, methyl cellulose, hydroxypropyl cellulose, hydroxyethyl methyl cellulose, polyvinyl alcohol, polyacrylic acid, or salts thereof, and particularly preferably carboxymethyl cellulose or a salt thereof.

The water-soluble thickener such as a carboxymethyl cellulose salt can increase the viscosity of the slurry for a porous membrane, so that the slurry for a porous membrane can have favorable application property. Usually, the carboxymethyl cellulose salt can also enhance the dispersion stability of the non-conductive particle in the slurry for a porous membrane, and enhance the binding property between the porous membrane and a separator substrate or a polar plate. Examples of the carboxymethyl cellulose salt may include sodium salts and ammonium salts. As the carboxymethyl cellulose salts, one type thereof may be solely used, and two or more types thereof may also be used in combination at any ratio.

The amount of the carboxymethyl cellulose salt, relative to 100 parts by weight of the non-conductive particle, is preferably 0.1 parts by weight or more, and more preferably 0.2 parts by weight or more, and is preferably 10 parts by weight or less, more preferably 7 parts by weight or less, and particularly preferably 5 parts by weight or less. When the amount of the carboxymethyl cellulose salt falls within the aforementioned range, the viscosity of the slurry for a porous membrane is allowed to fall within a suitable range such that handling becomes easy. Furthermore, the carboxymethyl cellulose salt may be usually contained also in the porous membrane. When the amount of the carboxymethyl cellulose salt is equal to or more than the lower limit of the aforementioned range, the porous membrane can have enhanced strength. When the amount of the carboxymethyl cellulose salt is equal to or less than the upper limit of the aforementioned range, the porous membrane can have favorable flexibility.

The slurry for a porous membrane according to the present invention may also include, for example, an isothiazoline-based compound, a pyrithione compound, a disperser, a leveling agent, an antioxidant, a thickener, an antifoaming agent, a wetting agent, and an electrolytic solution additive having a function of suppressing decomposition of an electrolytic solution.

The slurry for a porous membrane according to the present invention may further include an acidic component and/or a basic component for adjusting the pH. Examples of the acidic and basic components may be the same as the examples having been described for the components of the binder composition.

<2.4. Physical Properties of Slurry for Porous Membrane>

The pH of the slurry for a porous membrane according to the present invention exceeds 7.0, and is preferably 7.5 or more, more preferably 8.0 or more, and further more preferably 8.5 or more. When the pH of the slurry falls within this range, the polycarboxylic acid (A) can be kept in a water-soluble state. Due to the thickening effect thereof, the slurry for a porous membrane can exhibit sufficient viscosity, occurrence of application failure can be reduced, and high high-temperature cycle property can be achieved. The upper limit of the pH may be, but not particularly limited to, for example, 12.0. The pH of the slurry for a porous membrane can be adjusted by adjusting the content of the polycarboxylic acid and other components and by adding the acidic or basic component for adjusting the pH during the manufacture of the slurry for a porous membrane as necessary.

The slurry for a porous membrane according to the present invention may be prepared to have a viscosity suitable for application. The viscosity of the slurry for a porous membrane according to the present invention is preferably 20 mPa·s or more, more preferably 50 mPa·s or more, and further more preferably 70 mPa·s or more, and is preferably 250 mPa·s or less, more preferably 150 mPa·s or less, and further more preferably 100 mPa·s or less. When the viscosity of the slurry for a porous membrane is equal to or more than the aforementioned lower limit, occurrence of application failure can be reduced, and high high-temperature cycle property can be achieved. When the viscosity of the slurry for a porous membrane is equal to or less than the aforementioned upper limit, application with less application unevenness can be achieved, and high high-temperature cycle property can be achieved. The viscosity of the slurry for a porous membrane is a value measured using a B-type viscometer at a temperature of 25° C. and a revolution of 60 rpm. The viscosity of the slurry for a porous membrane may be adjusted by adjusting the molecular weight of the polycarboxylic acid as well as the content of the polycarboxylic acid, water, and acidic and basic components.

<2.5. Manufacturing Method of Slurry for Porous Membrane>

The slurry for a porous membrane according to the present invention may be manufactured by an optional manufacturing method. Preferable examples of the manufacturing method of the slurry for a porous membrane according to the present invention may include a method of mixing the aforementioned binder composition according to the present invention and other components. In particular, it is preferable to supply all of the polycarboxylic acid (A) and the particulate polymer by adding the binder composition for a porous membrane containing the polycarboxylic acid (A) and the particulate polymer in mixing the components.

In mixing, a disperser may be used as necessary to disperse the aforementioned components, particularly the non-conductive particle, in the slurry for a porous membrane. As the disperser, a media-less disperser is preferably used to decrease an undesirable reduction in particle size of the non-conductive particle.

Furthermore, the pH may be adjusted as necessary before or after such mixing. The pH may be adjusted by appropriately adding an acid or a base.

By adopting the aforementioned method, a high-quality slurry for a porous membrane can be easily manufactured by mixing aqueous solutions when the slurry for a porous membrane is needed. Specifically, when the binder composition according to the present invention has a pH within a certain range and includes the specific polycarboxylic acid (A), the binder composition can retain the polycarboxylic acid (A) in a stable state and in a state of being able to be easily used when needed. The slurry for a porous membrane is manufactured when needed, by mixing this binder composition with other components constituting the slurry for a porous membrane, and further adjusting the pH within a specific range as necessary. Accordingly, the binder composition can enjoy both high preservation stability and appropriate viscosity in use.

<3. Porous Membrane>

The porous membrane for a secondary battery according to the present invention (hereinafter, sometimes simply referred to as the porous membrane according to the present invention) is obtained by forming a layer of the slurry for a porous membrane of a secondary battery according to the present invention and drying the formed layer.

The layer of the slurry for a porous membrane may be obtained by applying the slurry for a porous membrane onto a substrate. The substrate is a member onto which a membrane of the slurry for a porous membrane is formed. The substrate is not limited. For example, a membrane of the slurry for a porous membrane may be formed on the surface of a release film, from which a solvent may be removed to form a porous membrane, and then the porous membrane may be peeled from the release film. However, from the viewpoint of omitting the process of peeling the porous membrane thereby to improve manufacturing efficiency, a component of a battery is usually used as the substrate. Examples of such a component of a battery may include a separator substrate and a polar plate.

Examples of the application method may include a doctor blade method, a dipping method, a reverse roll method, a direct roll method, a gravure method, an extrusion method, and a brushing method. Among these, dipping and gravure methods are preferable, because a uniform porous membrane can be obtained. Since the slurry for a porous membrane according to the present invention includes specific compositions and physical properties, the application is easy, a high-quality layer can be easily obtained, and the content of moisture remaining in the porous membrane can be reduced.

Examples of a specific method for drying the layer of the slurry for a porous membrane may include: drying with air such as warm air, hot air, and low moisture air; vacuum drying; and a drying process by irradiation with IR, far IR, electron beams, or the like.

The temperature for the drying is preferably 40° C. or higher, more preferably 45° C. or higher, and particularly preferably 50° C. or higher, and is preferably 90° C. or lower, and more preferably 80° C. or lower. When the drying temperature is equal to or higher than the lower limit of the aforementioned range, a solvent and a low molecular compound can be efficiently removed from the slurry for a porous membrane. Furthermore, when the drying temperature is equal to or lower than the upper limit, deformation of the substrate due to heat can be suppressed.

The drying time is preferably 5 seconds or more, more preferably 10 seconds or more, and particularly preferably 15 seconds or more, and is preferably 3 minutes or less, and more preferably 2 minutes or less. When the drying time is equal to or more than the lower limit of the aforementioned range, the solvent can be sufficiently removed from the slurry for a porous membrane, thereby improving the output property of the battery. When the drying time is equal to or less than the upper limit, manufacturing efficiency can be enhanced.

In the manufacturing method of the porous membrane according to the present invention, an optional operation other than the aforementioned operations may be performed.

For example, a pressurization treatment may be performed to the porous membrane by a press process such as mold press and roll press. Performing the pressurization treatment can improve the binding property between the substrate and the porous membrane. However, from the viewpoint of maintaining the porosity of the porous membrane within a preferable range, it is preferable that the pressure and the pressurization time are appropriately controlled not to excessively increase.

Furthermore, in order to remove residual moisture, the porous membrane is preferably dried by, for example, vacuum drying or in a dry room.

The thickness of the porous membrane according to the present invention is preferably 0.1 µm or more, more preferably 0.2 µm or more, and particularly preferably 0.3 µm or more, and is preferably 20 µm or less, more preferably 15 µm or less, and particularly preferably 10 µm or less. When the thickness of the porous membrane is equal to or more than the lower limit of the aforementioned range, heat resistance of the porous membrane can be increased. Furthermore, when the thickness of the porous membrane is equal to or less than the upper limit, reduction of ion conductivity caused by the porous membrane can be suppressed.

<4. Separator for Secondary Battery>

When a separator substrate is used as a substrate, there may be obtained a separator for a secondary battery including a separator substrate and the porous membrane according to the present invention. The porous membrane according to the present invention may be disposed on either only one surface or both surfaces of the separator substrate.

When the separator including the porous membrane according to the present invention is used as a separator in a secondary battery, the residual moisture content in the porous membrane is low, the thermal shrinkage of the porous membrane is small, and the adhesion strength between the porous membrane and the substrate can be enhanced. Therefore, high-temperature cycle property of the secondary battery can be improved.

Examples of the separator substrate to be used may include a porous substrate having fine pores. The use of such a separator substrate enables prevention of a short circuit in a secondary battery without interfering with charging and discharging of the battery. Specific examples of the separator substrate may include a microporous membrane or nonwoven fabric containing a polyolefin resin such as a polyethylene resin and a polypropylene resin, an aromatic polyamide resin, and the like.

The thickness of the separator substrate is preferably 0.5 µm or more, and more preferably 1 µm or more, and is preferably 40 µm or less, and more preferably 30 µm or less. When the thickness of the separator substrate is within this range, resistance due to the separator substrate in a secondary battery decreases, and workability during the manufacture of the battery is excellent.

<5. Electrode for Secondary Battery>

When a polar plate is used as a substrate, there may be obtained an electrode for a secondary battery including a polar plate and the porous membrane according to the present invention. As described herein, a "polar plate" refers to a member other than the porous membrane in an electrode including the porous membrane. The polar plate usually includes a current collector and an electrode active material layer. The electrode for a secondary battery including a polar plate and the porous membrane according to the present invention usually includes a current collector, an electrode active material layer, and the porous membrane according to the present invention in this order. For example, when the polar plate includes an electrode active material layer disposed only on one surface of a current collector, it may have a layer structure of current collector/electrode active material layer/porous membrane. Furthermore, for example, when the polar plate includes electrode active material layers disposed on both surfaces of a current collector, it may have a layer structure of porous membrane/electrode active material layer/current collector/electrode active material layer/porous membrane.

When the electrode including the porous membrane according to the present invention is used as an electrode in a secondary battery, the residual moisture content in the porous membrane is low, the thermal shrinkage of the porous membrane is small, and the adhesion strength between the porous membrane and the substrate can be enhanced. Therefore, high-temperature cycle property of the secondary battery can be improved.

<5.1. Current Collector>

As the current collector of a polar plate, a material having electric conductivity and electrochemical durability may be used. Usually, as a material of this current collector, a metal material is used. Examples of the metal material may include iron, copper, aluminum, nickel, stainless steel, titanium, tantalum, gold, and platinum. Among these, aluminum is preferable as a current collector used for positive electrodes, and copper is preferable as a current collector used for negative electrodes. As the aforementioned materials, one type thereof may be solely used, and two or more thereof may also be used in combination at any ratio.

The shape of the current collector is not particularly limited, but is preferably a sheet having a thickness of approximately 0.001 mm to 0.5 mm.

<5.2. Electrode Active Material Layer>

The electrode active material layer is a layer disposed on the current collector, and contains an electrode active material. The type of the electrode active material varies depending on the type of the secondary battery. In the following, an electrode active material for a lithium ion secondary battery will be particularly described. However, the electrode active material is not limited to the following materials.

As the electrode active material for a lithium ion secondary battery, a material that can reversibly intercalate or deintercalate lithium ions by applying an electropotential in an electrolytic solution may be used. The electrode active material to be used may be an inorganic compound, and may also be an organic compound.

A positive electrode active material is roughly classified into a material composed of an inorganic compound and a material composed of an organic compound. Examples of the positive electrode active material composed of an inorganic compound may include a transition metal oxide, a composite oxide of lithium and transition metal, and a transition metal sulfide. Examples of the aforementioned transition metal to be used may include Fe, Co, Ni, and Mn. Specific examples of the inorganic compound used in the positive electrode active material may include lithium-containing composite metal oxides such as $LiCoO_2$, $LiNiO_2$, $LiMnO_2$, $LiMn_2O_4$, $LiFePO_4$, and $LiFeVO_4$; transition metal sulfides such as $TiS_2$, $TiS_3$, and amorphous $MoS_2$; and transition metal oxides such as $Cu_2V_2O_3$, amorphous $V_2O$—$P_2O_5$, $MoO_3$, $V_2O_5$, and $V_6O_{13}$. Examples of the positive electrode active material composed of an organic compound may include conductive polymers such as polyacetylene and poly-p-phenylene.

Furthermore, the positive electrode active material composed of a composite material that is a combination of an inorganic compound and an organic compound may also be used.

Further, for example, an iron-based oxide may be subjected to reduction firing in the presence of a carbon source substance to prepare a composite material coated with a carbon material, and this composite material may be used as a positive electrode active material. An iron-based oxide tends to have poor electrical conductivity. However, when the iron-based oxide is modified to be the aforementioned composite material, it may be used as a high-performance positive electrode active material.

Furthermore, the aforementioned compound may be subjected to partial element substitution to be used as the positive electrode active material.

As these positive electrode active materials, one type thereof may be solely used, and two or more types thereof may also be used in combination at any ratio. A mixture of the aforementioned inorganic compound and organic compound also may be used as the positive electrode active material.

The particle size of the positive electrode active material may be selected in view of other structural requirements for a secondary battery. From the viewpoint of improvement of battery properties such as load property and cycle property, the volume average particle size of the positive electrode active material is preferably 0.1 µm or more, and more preferably 1 µm or more, and is preferably 50 µm or less, and more preferably 20 µm or less. When the volume average particle size of the positive electrode active material falls within this range, a battery having a large charge and discharge capacity can be obtained, and handling in manufacturing an electrode slurry composition and an electrode is easy.

The ratio of the positive electrode active material in the electrode active material layer is preferably 90% by weight or more, and more preferably 95% by weight or more, and is preferably 99.9% by weight or less, and more preferably 99% by weight or less. When the amount of the positive electrode active material falls within the aforementioned range, the secondary battery can have increased capacity. Furthermore, flexibility of the positive electrode can be improved, and the binding property between the current collector and the positive electrode active material layer can be improved.

Examples of the negative electrode active material may include carbonaceous materials such as amorphous carbon, graphite, naturally occurring graphite, artificial graphite, mesocarbon microbeads, and pitch-based carbon fiber; and conductive polymers such as polyacene. Further examples may include metals such as silicon, tin, zinc, manganese, iron and nickel, and alloys thereof; oxides of the metals or alloys; and sulfates of the metals or alloys. Still further examples may include metal lithium; lithium alloys such as Li—Al, Li—Bi—Cd, and Li—Sn—Cd; lithium transition metal nitrides; and silicon. Furthermore, the electrode active material to be used may include a conductive material attached on the surface thereof by a mechanical modification method. As these negative electrode active materials, one type thereof may be solely used, and two or more types thereof may also be used in combination at any ratio.

The particle size of the negative electrode active material is appropriately selected in view of other structural requirements for a secondary battery. From the viewpoint of improvement of battery properties such as initial efficiency, load property, and cycle property, the volume average particle size of the negative electrode active material is preferably 0.1 µm or more, more preferably 1 µm or more, and further preferably 5 µm or more, and is preferably 100 µm or less, more preferably 50 µm or less, and further preferably 20 µm or less.

The specific surface area of the negative electrode active material is, from the viewpoint of improvement in power density, preferably 2 $m^2/g$ or more, more preferably 3 $m^2/g$ or more, and further preferably 5 $m^2/g$ or more, and is preferably 20 $m^2/g$ or less, more preferably 15 $m^2/g$ or less, and further preferably 10 $m^2/g$ or less. The specific surface area of the negative electrode active material may be measured by, for example, the BET method.

The ratio of the negative electrode active material in the electrode active material layer is preferably 85% by weight or more, and more preferably 88% by weight or more, and is preferably 99% by weight or less, and more preferably 97% by weight or less. When the amount of the negative electrode active material falls within the aforementioned range, the negative electrode can achieve excellent flexibility and binding property while exhibiting high capacity.

The electrode active material layer preferably contains a binder for electrodes other than the electrode active material. The inclusion of the binder for electrodes improves binding property of the electrode active material layer, and enhances strength against mechanical force applied during processes such as winding of the electrode. Furthermore, since the inclusion of the binder decreases tendency of the electrode active material layer to cause peeling from the current collector and the porous membrane, and thereby the risk of a short circuit due to the peeled material is reduced.

As the binder for electrodes, a polymer, for example, may be used. Examples of the polymer that may be used as the binder for electrodes may include polyethylene, polytetrafluoroethylene (PTFE), polyvinylidene fluoride (PVDF), a tetrafluoroethylene-hexafluoropropylene copolymer (FEP), a polyacrylic acid derivative, and a polyacrylonitrile derivative.

Furthermore, particles of the soft polymers exemplified below may be used as a particulate polymer. Examples of the soft polymer may include:

(i) an acrylic-based soft polymer that is a homopolymer of an acrylic acid or methacrylic acid derivative or a copolymer of the acrylic acid or methacrylic acid derivative with a monomer, such as polybutyl acrylate, polybutyl methacrylate, polyhydroxyethyl methacrylate, polyacrylamide, polyacrylonitrile, a butyl acrylate-styrene copolymer, a butyl acrylate-acrylonitrile copolymer, and a butyl acrylate-acrylonitrile-glycidyl methacrylate copolymer;

(ii) an isobutylene-based soft polymer such as polyisobutylene, isobutylene-isoprene rubber, and an isobutylene-styrene copolymer;

(iii) a diene-based soft polymer such as polybutadiene, polyisoprene, a butadiene-styrene random copolymer, an isoprene-styrene random copolymer, an acrylonitrile-butadiene copolymer, an acrylonitrile-butadiene.styrene copolymer, a butadiene-styrene block copolymer, a styrene-butadiene-styrene block copolymer, an isoprene-styrene block copolymer, and a styrene-isoprene-styrene block copolymer;

(iv) a silicon-containing soft polymer such as dimethylpolysiloxane, diphenylpolysiloxane, and dihydroxypolysiloxane;

(v) an olefin-based soft polymer such as liquid polyethylene, polypropylene, poly-1-butene, an ethylene-α-olefin copolymer, a propylene.α-olefin copolymer, an ethylene-propylene-diene copolymer (EPDM), and an ethylene-propylene-styrene copolymer;

(vi) a vinyl-based soft polymer such as polyvinyl alcohol, polyvinyl acetate, polyvinyl stearate, and a vinyl acetate-styrene copolymer;

(vii) an epoxy-based soft polymer such as polyethylene oxide, polypropylene oxide, and epichlorhydrin rubber;

(viii) a fluorine-containing soft polymer such as vinylidene fluoride-based rubber and tetrafluoroethylene-propylene rubber; and (ix) other soft polymers such as natural rubber, polypeptide, protein, polyester-based thermoplastic elastomer, vinyl chloride-based thermoplastic elastomer, and polyamide-based thermoplastic elastomer.

These soft polymers may have a crosslinked structure, and may be modified to have a functional group introduced thereinto.

The aforementioned polymers may be particulate, or may be non-particulate.

As the binders for electrodes, one type thereof may be solely used, and two or more types thereof may also be used in combination at any ratio.

The amount of the binder for electrodes in the electrode active material layer relative to 100 parts by weight of the electrode active material is preferably 0.1 parts by weight or more, more preferably 0.2 parts by weight or more, and particularly preferably 0.5 parts by weight or more, and is preferably 5 parts by weight or less, and more preferably 3 parts by weight or less. When the amount of the binder for electrodes falls within the aforementioned range, the electrode active material can be prevented from detaching from the electrode without disturbing a battery reaction.

The electrode active material layer may include optional components other than the electrode active material and the binder for electrodes, as long as the effects of the present invention are not significantly impaired. Examples thereof may include a conductive material and a reinforcing material. As the optional components, one type thereof may be solely used, and two or more thereof may also be used in combination at any ratio.

Examples of the conductive material may include conductive carbon such as acetylene black, Ketjen black, carbon black, graphite, vapor grown carbon fiber, and carbon nanotube; carbon powder such as graphite; and fiber and foil of various metals. The use of the conductive material enables electrical contact between the electrode active materials to be enhanced and battery properties such as cycle property to be improved.

The specific surface area of the conductive material is preferably 50 $m^2/g$ or more, more preferably 60 $m^2/g$ or more, and particularly preferably 70 $m^2/g$ or more, and is preferably 1500 $m^2/g$ or less, more preferably 1200 $m^2/g$ or less, and particularly preferably 1000 $m^2/g$ or less. When the specific surface area of the conductive material is equal to or more than the lower limit of the aforementioned range, the secondary battery can have improved low-temperature output property. When the specific surface area of the conductive material is equal to or less than the upper limit, the binding property between the electrode active material layer and the current collector can be enhanced.

Examples of the reinforcing material to be used may include a variety of inorganic and organic fillers that are spherical, plate-like, rod-like, or fibrous. The use of the reinforcing material can give the electrode toughness and flexibility, and excellent long-term cycle property can be obtained.

The use amount of each of the conductive material and the reinforcing material relative to 100 parts by weight of the electrode active material is usually 0 parts by weight or more, and preferably 1 part by weight or more, and is preferably 20 parts by weight or less, and more preferably 10 parts by weight or less.

The thickness of the electrode active material layer for both positive and negative electrodes is preferably 5 µm or more, and more preferably 10 µm or more, and is preferably 300 µm or less, and more preferably 250 µm or less.

The manufacturing method of the electrode active material layer is not particularly limited. The electrode active material layer may be manufactured by, for example, applying an electrode slurry composition onto a current collector, and then drying the composition, where the electrode slurry composition contains the electrode active material and the solvent, and further the binder for an electrode and an optional component if necessary. As the solvent, any of water and an organic solvent may be used.

<6. Secondary Battery>

The secondary battery according to the present invention includes the porous membrane according to the present invention. The secondary battery usually includes a positive electrode, a negative electrode, and an electrolytic solution, and satisfies the following requirement (A), requirement (B), or both requirements (A) and (B).

(A) At least one of positive and negative electrodes of the secondary battery according to the present invention is an electrode including a polar plate and the porous membrane according to the present invention.

(B) The secondary battery according to the present invention includes a separator, and the separator is a separator including a separator substrate and the porous membrane according to the present invention.

The porous membrane according to the present invention has a low residual moisture content and small thermal shrinkage, and can enhance the adhesion strength between the porous membrane and the substrate. Therefore, when the electrode and/or the separator including the porous membrane according to the present invention are used as components of the secondary battery, high-temperature cycle property of the secondary battery can be improved.

<6.1. Separator>

The secondary battery according to the present invention includes in principle the separator including the porous membrane according to the present invention as a separator. However, when the secondary battery according to the present invention includes at least one of the positive and negative electrodes including the porous membrane according to the present invention, the secondary battery may include a separator other than the separator including the porous membrane according to the present invention as a separator. Since the porous membrane in the electrode including the porous membrane according to the present invention has a function as a separator, a separator may be omitted when the electrode includes the porous membrane according to the present invention.

<6.2. Electrode>

The secondary battery according to the present invention includes in principle the electrode including the porous membrane according to the present invention as one or both of the positive and negative electrodes. However, when the secondary battery according to the present invention includes as a separator the separator including the porous membrane according to the present invention, the secondary electrode may include an electrode that does not include the porous membrane according to the present invention as both of the positive and negative electrodes.

<6.3. Electrolytic Solution>

Examples of the electrolytic solution to be used may include an electrolytic solution obtained by dissolving a lithium salt as a support electrolyte in a non-aqueous solvent. Examples of the lithium salt may include $LiPF_6$, $LiAsF_6$, $LiBF_4$, $LiSbF_6$, $LiAlCl_4$, $LiClO_4$, $CF_3SO_3Li$, $C_4F_9SO_3Li$, $CF_3COOLi$, $(CF_3CO)_2NLi$, $(CF_3SO_2)_2NLi$, and $(C_2F_5SO_2)NLi$. In particular, $LiPF_6$, $LiClO_4$, and $CF_3SO_3Li$, which are easily dissolved in a solvent and exhibit high dissociation degree, are suitably used. One type thereof may be solely used, and two or more types thereof may also be used in combination at any ratio.

The amount of the support electrolyte in terms of the concentration in the electrolytic solution is preferably 1% by weight or more, and more preferably 5% by weight or more, and is preferably 30% by weight or less, and more preferably 20% by weight or less. When the amount of the support electrolyte falls within this range, high ion conductivity is obtained and the secondary battery can have favorable charge and discharge property.

As the solvent used in the electrolytic solution, there may be used a solvent in which the support electrolyte can dissolve. Examples of such a solvent may include alkyl carbonate compounds such as dimethyl carbonate (DMC), ethylene carbonate (EC), diethyl carbonate (DEC), propylene carbonate (PC), butylene carbonate (BC), and ethyl methyl carbonate (EMC); ester compounds such as γ-butyrolactone and methyl formate; ether compounds such as 1,2-dimethoxyethane and tetrahydrofuran; and sulfur-containing compounds such as sulfolane and dimethyl sulfoxide. In particular, dimethyl carbonate, ethylene carbonate, propylene carbonate, diethyl carbonate, and methyl ethyl carbonate are preferable, because high ion conductivity is easily obtained, and the usable temperature range is wide. As the solvents, one type thereof may be solely used, and two or more types thereof may also be used in combination at any ratio.

The electrolytic solution may contain an additive as necessary. Preferable examples of the additive may include carbonate-based compounds such as vinylene carbonate (VC). As the additives, one type thereof may be solely used, and two or more types thereof may also be used in combination at any ratio.

<6.4. Manufacturing Method of Secondary Battery>

The manufacturing method of the secondary battery according to the present invention is not particularly limited. For example, the aforementioned negative electrode and positive electrode may be stacked via a separator, and the resulting stack may be, for example, wound or folded in conformity with the battery shape, and placed in a battery container. Then, an electrolytic solution may be injected into the battery container, and the battery container may be sealed. Furthermore, expanded metal; an overcurrent prevention element such as a fuse and a PTC element; a lead plate; and the like may be placed as necessary, thereby preventing the increase in pressure inside the battery and the excessive charge and discharge. Examples of the battery shape may include laminate cell-type, coin-type, button-type, sheet-type, cylinder-type, rectangle-type, and flat-type.

EXAMPLES

Hereinafter, the present invention will be specifically described referring to Examples. However, the present invention is not limited to the following Examples, and the present invention may be optionally modified within the scope not departing from the claims of the present invention and equivalents thereto for implementation. Unless otherwise stated, "%" and "parts" indicating quantity in the following description are based on weight.

In Examples and Comparative Examples, measurement of the viscosity of the slurry for a porous membrane, measurement of pH, evaluation of adhesion strength, evaluation of stability of the binder composition, evaluation of high-temperature cycle property in the secondary battery, and determination on water solubility of the polycarboxylic acid (A) were each performed in the following manner.

<Glass Transition Temperature of Polycarboxylic Acid (A)>

The polycarboxylic acid (A) was dried in an environment of a humidity of 50% and 25° C. for three days to obtain a film having a thickness of 1.0 mm. This film was dried at 60° C. with a vacuum dryer for 10 hours. After that, the dried film as a sample was measured for glass transition temperature (° C.) in accordance with JIS K 7121 under the conditions of a measurement temperature of −100° C. to 180° C. and a temperature increasing rate of 5° C./min, using DSC6220SII (differential scanning calorimeter, manufactured by Nanotechnology Inc.).

<Viscosity>

The viscosity of the slurry for a porous membrane was measured using a B-type viscometer at 25° C. and a revolution of 60 rpm.

<Measurement Method of pH>

A desktop pH meter (F-51 manufactured by HORIBA) was calibrated with a pH standard solution (pH 4, pH 7, and pH 9). After that, this calibrated pH meter was used to measure the pH of a sample.

<Adhesion Strength Between Porous Membrane and Substrate>

A separator obtained in each of Examples and Comparative Examples was cut out into a rectangle of 10 mm in width×100 mm in length, and the rectangular separator was used as a test piece. A cellophane tape (prescribed in JIS Z1522) was affixed to the porous membrane surface of the test piece. The cellophane tape was fixed on the horizontal plane of a test board in a flat state, and one end of the separator was pulled in a vertical direction with respect to the cellophane tape surface at a pulling speed of 10 mm/min to effect peeling. The stress at that time was measured. The measurement was performed three times, and an average value thereof was calculated, which was adopted as the peel strength. The peel strength was evaluated in accordance with the following criteria. Higher peel strength indicates that the binding power between the porous membrane and the separator substrate is larger, that is, the adhesion strength is larger.

A: Peel strength is 200 N/m or more.

B: Peel strength is 150 N/m or more and less than 200 N/m.

C: Peel strength is 100 N/m or more and less than 150 N/m.

D: Peel strength is less than 100 N/m.

<Evaluation of Stability of Binder Composition>

In a 100-ml container, 100 ml of a binder composition was poured, and left to stand and preserved for one week.

After the standing and preservation, the solid content concentration of a supernatant of the binder composition was measured. Then, the solid content concentration maintenance ratio represented by the following formula was obtained, and evaluated in accordance with the following criteria. A larger solid content concentration maintenance ratio indicates that the sedimentation rate is slower, that is, the stability of the binder composition is higher.

Solid content concentration maintenance ratio (%)=
(solid content concentration in supernatant after preservation/solid content concentration of binder composition before preservation)×100

A: Solid content concentration maintenance ratio is 95% or more and 100% or less.

B: Solid content concentration maintenance ratio is 90% or more and less than 95%.

C: Solid content concentration maintenance ratio is 85% or more and less than 90%.

D: Solid content concentration maintenance ratio is less than 85%.

<Evaluation of High-Temperature Cycle Property of Secondary Battery>

The lithium ion secondary battery obtained in each of Examples and Comparative Examples was left to stand in an environment of 25° C. for 24 hours. Thereafter an operation of charging and discharging was performed with charging at 4.35 V and 0.1 C and discharging at 2.75 V and 0.1 C in an environment of 25° C., to measure initial capacity C0. Furthermore, repetition of charging and discharging cycle was performed in an environment of 60° C. wherein charging at 4.35 V and 0.1 C and discharging at 2.75 V and 0.1 C was defined as one cycle, and capacity C1 after 1000 cycles was measured. From the values C0 and C1, a capacity maintenance ratio was calculated by formula $\Delta C=(C1/C0)\times 100(\%)$, and evaluated in accordance with the following criteria. When this value is higher, it is indicated that high-temperature cycle property is better.

(Evaluation Criteria)

A: Capacity maintenance ratio is 70% or more.

B: Capacity maintenance ratio is 60% or more and less than 70%.

C: Capacity maintenance ratio is 50% or more and less than 60%.

D: Capacity maintenance ratio is less than 50%.

<Determination of Water-Solubility of Polycarboxylic Acid (A)>

The concentration and pH of an aqueous dispersion liquid of the polycarboxylic acid (A) obtained in each of Examples and Comparative Examples were adjusted to prepare an aqueous solution having a concentration of 10% and a pH of 6.5 and an aqueous solution having a concentration of 10% and a pH of 8.0. Each aqueous solution was stirred at 25° C. for one hour, and used as an evaluation liquid.

The evaluation liquid was poured into a cell having an optical path length of 30 mm, and the scattered light and the total transmitted light were measured using a haze meter. Then, the haze of the evaluation liquid was calculated by formula: haze=scattered light/total transmitted light×100 (%). When the haze of the evaluation liquid was 60% or more, it was determined that the polycarboxylic acid (A) is water-insoluble, and when the haze of the evaluation liquid is less than 60%, it was determined that the polycarboxylic acid (A) is water-soluble.

Example 1

(1-1. Preparation of Polycarboxylic Acid (A))

Into a 5 MPa pressure resistant container equipped with a stirrer, 100.0 parts of a monomer composition, 150 parts of ion exchanged water, and 1.0 part of potassium persulfate (a polymerization initiator) were charged. Then, the mixture was sufficiently stirred, and then warmed to 60° C. to initiate polymerization. The monomer composition consisted of 30 parts of methacrylic acid (a carboxylic acid group-containing monomer), 56 parts of ethyl acrylate (monomer (U1)), 12.2 parts of butyl acrylate (monomer (U2)), 0.8 parts of ethylene dimethacrylate (crosslinkable monomer), and 1.0 part of ammonium polyoxyalkylene alkenyl ether sulfate (reactive surfactant, trade name "Latemul PD-104" (manufactured by Kao Corporation)). The mixture was cooled to terminate the reaction when the polymerization conversion ratio reached 96%, and an aqueous sodium hydroxide solution was added to adjust the pH to 4.0. Thus, an aqueous dispersion liquid containing the polycarboxylic acid (A) was obtained.

The obtained polycarboxylic acid (A) was evaluated for water solubility at pH 6.5 and 8.0.

(1-2. Preparation of Particulate Polymer)

Into a 5 MPa pressure resistant container equipped with a stirrer, 100.0 parts of a monomer composition, 0.4 parts of sodium dodecylbenzenesulfonate as an emulsifier, 150 parts of ion exchanged water, and 0.3 parts of potassium persulfate as a polymerization initiator were charged. The mixture was sufficiently stirred, and then warmed to 50° C. to initiate polymerization. The monomer composition consisted of 92.8 parts of butyl acrylate, 2 parts of acrylonitrile, 2 parts of methacrylic acid, 1.6 parts of N-methylol acrylamide, and 1.6 parts of acrylamide. The mixture was cooled to terminate the reaction when the polymerization conversion ratio reached 96%. Thus, a mixture containing the particulate polymer was obtained. Into the mixture containing the particulate polymer, a 5% aqueous sodium hydroxide solution was added to adjust the pH to 6.5. Thus, an aqueous dispersion liquid containing the desired particulate polymer was obtained.

(1-3. Manufacture of Binder Composition for Porous Membrane)

90 Parts (in terms of solid content) of the aqueous dispersion liquid containing the particulate polymer obtained in step (1-2), and 10 parts (in terms of solid content) of the aqueous dispersion liquid containing the polycarboxylic acid (A) obtained in step (1-1) were mixed. Thus, a binder composition for a porous membrane was obtained.

The obtained binder composition for a porous membrane was measured for its pH. Furthermore, the binder composition for a porous membrane was evaluated for its stability.

(1-4. Manufacture of Slurry for Porous Membrane)

100 Parts of an alumina particle (volume average particle size: 0.5 μm, BET specific surface area: 5.0 m$^2$/g) as a non-conductive particle, 2 parts of a sodium carboxymethyl cellulose salt (manufactured by Daicel Corporation, product name "Daicel 1220"), and 6 parts (in terms of solid content) of the binder composition for a porous membrane obtained in the step (1-3) were mixed. Water was further mixed to adjust the solid content concentration to 40% by weight. An aqueous sodium hydroxide solution was further added to adjust the pH to 9.0. Thus, a slurry for a porous membrane was manufactured.

The obtained slurry for a porous membrane was measured for its pH and viscosity.

(1-5. Manufacture of Separator)

The slurry for a porous membrane obtained in the step (1-4) was applied onto one surface of a single-layer polypropylene separator substrate (manufactured by Celgard Inc., trade name "Celgard Inc. 2500") using a gravure coater so that the coating amount after drying becomes 6 mg/cm$^2$. Then, the coat was dried. This drying was performed by conveying the separator substrate in an oven at 100° C. over one minute at a speed of 20 m/min. Thus, there was obtained a separator including a separator substrate and a porous membrane formed on one surface of the separator substrate.

The obtained separator was evaluated for its adhesion strength.

(1-6. Manufacture of Positive Electrode)

100 Parts of LiCoO$_2$ (volume average particle size D50: 12 μm) as a positive electrode active material, 2 parts of acetylene black (manufactured by Denki Kagaku Kogyo Kabushiki Kaisha, HS-100) as a conductive material, 2 parts in terms of solid content of PVDF (polyvinylidene fluoride, manufactured by Kureha Corporation, #7208) as a binder for positive electrode active material layers, and NMP (N-methylpyrrolidone) were mixed in an amount such that the total solid content concentration becomes 70%. These were mixed in a planetary mixer to obtain a slurry composition for positive electrodes.

The obtained slurry composition for positive electrodes was applied onto an aluminum foil having a thickness of 20 μm as a current collector using a comma coater, such that the film thickness of the dried coat becomes approximately 150 μm. Then, the coat was dried. This drying was performed by conveying the aluminum foil in an oven at 60° C. over two minutes at a speed of 0.5 m/min. After that, the positive electrode raw material was rolled with a roll press. Thus, a positive electrode including a positive electrode active material layer with a thickness of 95 μm was obtained.

(1-7. Manufacture of Negative Electrode)

Into a 5 MPa pressure resistant container equipped with a stirrer, 33.5 parts of 1,3-butadiene, 3.5 parts of itaconic acid, 62 parts of styrene, 1 part of 2-hydroxyethyl acrylate, 0.4 parts of sodium dodecylbenzenesulfonate as an emulsifier, 150 parts of ion exchanged water, and 0.5 parts of potassium peroxodisulfate as a polymerization initiator were charged. The mixture was sufficiently stirred, and then warmed to 50° C. to initiate polymerization. The mixture was cooled to terminate the reaction when the polymerization conversion ratio reached 96%. Thus, a mixture containing a binder for negative electrode active material layers (SBR) was obtained. A 5% aqueous sodium hydroxide solution was added to the mixture containing the aforementioned binder for negative electrode active material layers, and pH thereof was adjusted to 8. Then, unreacted monomers were removed through distillation by heating under reduced pressure. After that, the obtained product was cooled to 30° C. or lower. Thus, an aqueous dispersion liquid containing the desired binder for negative electrode active material layers was obtained.

A mixture of 100 parts of artificial graphite (volume average particle size D50: 15.6 μm) and 1 part in terms of solid content of a 2% aqueous solution of sodium salt of carboxymethyl cellulose (manufactured by Nippon Paper Industries Co., Ltd., MAC350HC) as a thickener was prepared and the solid content concentration thereof was adjusted to 68% with ion exchanged water. After that, the prepared mixture was mixed at 25° C. for 60 minutes. The mixture was further adjusted to a solid content concentration of 62% with ion exchanged water. After that, the product was mixed at 25° C. for 15 minutes. The aforementioned binder for negative electrode active material layers (SBR) in an amount of 1.5 parts in terms of solid content and ion exchanged water were poured to adjust the final solid content concentration to 52%. The obtained product was further mixed for 10 minutes. This mixture was subjected to a defoaming treatment under reduced pressure. Thus, a slurry composition for negative electrodes having favorable fluidity was prepared.

The obtained slurry composition for negative electrodes was applied onto a copper foil having a thickness of 20 μm as a current collector using a comma coater such that the film thickness of the dried coat becomes approximately 150 μm. Then, the coat was dried. This drying was performed by conveying the copper foil in an oven at 60° C. over two minutes at a speed of 0.5 m/min. After that, the negative electrode raw material was rolled with a roll press. Thus, a negative electrode including a negative electrode active material layer with a thickness of 100 μm was obtained.

(1-8. Manufacture of Lithium Ion Secondary Battery)

As an exterior for a battery, an aluminum exterior package was prepared. The positive electrode obtained in step (1-6) was cut out into a square of 4.6 cm×4.6 cm to obtain a rectangular positive electrode. The separator obtained in step (1-5) was cut out into a square of 5.5 cm×5.5 cm to obtain a rectangular separator. Furthermore, the negative electrode obtained in step (1-7) was cut out into a square of 5 cm×5 cm to obtain a rectangular negative electrode. The rectangular positive electrode was disposed in an aluminum exterior package such that the surface on the current collector side of the positive electrode comes in contact with the exterior package. The rectangular separator was disposed on the surface on the positive electrode active material layer side of the rectangular positive electrode such that the surface on the porous membrane side comes in contact with the rectangular positive electrode. Furthermore, the rectangular negative electrode was disposed on the separator such that the surface on the negative electrode active material layer side faces the separator. An electrolytic solution (solvent: EC/DEC/VC=68.5/30/1.5 in volume ratio, electrolyte: LiPF$_6$ having a concentration of 1 M) was injected such that air was not remained. Furthermore, for sealing the opening of the aluminum package, heat sealing at 150° C. was performed to close the opening of the aluminum exterior package. Thus, a lithium ion secondary battery was manufactured.

This lithium ion secondary battery was evaluated for high-temperature cycle property.

Example 2

A lithium ion secondary battery was manufactured in the same manner as in Example 1, except that the following matters were changed. Then, the manufactured lithium ion secondary battery and its components were measured and evaluated in the same manner as in Example 1.

In the manufacture of the polycarboxylic acid (A) in step (1-1), the monomer composition was changed to a composition consisting of 28 parts of methacrylic acid (a carboxylic acid group-containing monomer), 58 parts of ethyl acrylate (monomer (U1)), 12.2 parts of butyl acrylate (monomer (U2)), 0.8 parts of ethylene dimethacrylate (crosslinkable monomer), and 1.0 part of ammonium polyoxyalkylene alkenyl ether sulfate (reactive surfactant).

Example 3

A lithium ion secondary battery was manufactured in the same manner as in Example 1, except that the following matters were changed. Then, the manufactured lithium ion secondary battery and its components were measured and evaluated in the same manner as in Example 1.
In the manufacture of the polycarboxylic acid (A) in step (1-1), the monomer composition was changed to a composition consisting of 35 parts of methacrylic acid (a carboxylic acid group-containing monomer), 45.5 parts of ethyl acrylate (monomer (U1)), 17.7 parts of butyl acrylate (monomer (U2)), 0.8 parts of ethylene dimethacrylate (crosslinkable monomer), and 1.0 part of ammonium polyoxyalkylene alkenyl ether sulfate (reactive surfactant).

Example 4

A lithium ion secondary battery was manufactured in the same manner as in Example 1, except that the following matters were changed. Then, the manufactured lithium ion secondary battery and its components were measured and evaluated in the same manner as in Example 1.
In the manufacture of the polycarboxylic acid (A) in step (1-1), the monomer composition was changed to a composition consisting of 22 parts of methacrylic acid (a carboxylic acid group-containing monomer), 56 parts of ethyl acrylate (monomer (U1)), 20.2 parts of butyl acrylate (monomer (U2)), 0.8 parts of ethylene dimethacrylate (crosslinkable monomer), and 1.0 part of ammonium polyoxyalkylene alkenyl ether sulfate (reactive surfactant).

Example 5

A lithium ion secondary battery was manufactured in the same manner as in Example 1, except that the following matters were changed. Then, the manufactured lithium ion secondary battery and its components were measured and evaluated in the same manner as in Example 1.
In the manufacture of the polycarboxylic acid (A) in step (1-1), the monomer composition was changed to a composition consisting of 44 parts of methacrylic acid (a carboxylic acid group-containing monomer), 29 parts of ethyl acrylate (monomer (U1)), 25.2 parts of butyl acrylate (monomer (U2)), 0.8 parts of ethylene dimethacrylate (crosslinkable monomer), and 1.0 part of ammonium polyoxyalkylene alkenyl ether sulfate (reactive surfactant).

Example 6

A lithium ion secondary battery was manufactured in the same manner as in Example 1, except that the following matters were changed. Then, the manufactured lithium ion secondary battery and its components were measured and evaluated in the same manner as in Example 1.
In the manufacture of the polycarboxylic acid (A) in step (1-1), the pH after the termination of the reaction was not adjusted to obtain a polycarboxylic acid aqueous dispersion liquid with pH of 3.3. It was used as it was in the subsequent step as a polycarboxylic acid aqueous dispersion liquid.

Example 7

A lithium ion secondary battery was manufactured in the same manner as in Example 1, except that the following matters were changed. Then, the manufactured lithium ion secondary battery and its components were measured and evaluated in the same manner as in Example 1.
In the pH adjustment in the manufacture of the polycarboxylic acid (A) in step (1-1), an aqueous sodium hydroxide solution was added to adjust the pH not to 4.0 but to 6.4.
In the pH adjustment in the preparation of the particulate polymer in step (1-2), an aqueous sodium hydroxide solution was added to adjust the pH not to 6.5 but to 6.4.

Example 8

A lithium ion secondary battery was manufactured in the same manner as in Example 1, except that the following matters were changed. Then, the manufactured lithium ion secondary battery and its components were measured and evaluated in the same manner as in Example 1.
In the manufacture of the polycarboxylic acid (A) in step (1-1), the monomer composition was changed to a composition consisting of 30 parts of methacrylic acid (a carboxylic acid group-containing monomer), 34 parts of ethyl acrylate (monomer (U1)), 34.2 parts of butyl acrylate (monomer (U2)), 0.8 parts of ethylene dimethacrylate (crosslinkable monomer), and 1.0 part of ammonium polyoxyalkylene alkenyl ether sulfate (reactive surfactant).

Example 9

A lithium ion secondary battery was manufactured in the same manner as in Example 1, except that the following matters were changed. Then, the manufactured lithium ion secondary battery and its components were measured and evaluated in the same manner as in Example 1.
In the manufacture of the polycarboxylic acid (A) in step (1-1), the monomer composition was changed to a composition consisting of 30 parts of methacrylic acid (a carboxylic acid group-containing monomer), 59.5 parts of ethyl acrylate (monomer (U1)), 8.7 parts of butyl acrylate (monomer (U2)), 0.8 parts of ethylene dimethacrylate (crosslinkable monomer), and 1.0 part of ammonium polyoxyalkylene alkenyl ether sulfate (reactive surfactant).

Example 10

A lithium ion secondary battery was manufactured in the same manner as in Example 1, except that the following matters were changed. Then, the manufactured lithium ion secondary battery and its components were measured and evaluated in the same manner as in Example 1.
In the manufacture of the polycarboxylic acid (A) in step (1-1), the monomer composition was changed to a composition consisting of 35 parts of methacrylic acid (a carboxylic acid group-containing monomer), 51 parts of ethyl acrylate (monomer (U1)), 12.2 parts of butyl acrylate (monomer (U2)), 0.8 parts of ethylene dimethacrylate (crosslinkable monomer), and 1.0 part of ammonium polyoxyalkylene alkenyl ether sulfate (reactive surfactant).

Example 11

A lithium ion secondary battery was manufactured in the same manner as in Example 1, except that the following matters were changed. Then, the manufactured lithium ion secondary battery and its components were measured and evaluated in the same manner as in Example 1.

In the manufacture of the particulate polymer in step (1-2), the monomer composition was changed to a composition consisting of 95 parts of butyl acrylate, 2 parts of acrylonitrile, 2 parts of methacrylic acid, 0.5 parts of N-methylol acrylamide, and 0.5 parts of acrylamide.

Example 12

A lithium ion secondary battery was manufactured in the same manner as in Example 1, except that the following matters were changed. Then, the manufactured lithium ion secondary battery and its components were measured and evaluated in the same manner as in Example 1.

In the manufacture of the particulate polymer in step (1-2), the monomer composition was changed to a composition consisting of 92.2 parts of butyl acrylate, 2 parts of acrylonitrile, 2 parts of methacrylic acid, 1.9 parts of N-methylol acrylamide, and 1.9 parts of acrylamide.

Example 13

A lithium ion secondary battery was manufactured in the same manner as in Example 1, except that the following matters were changed. Then, the manufactured lithium ion secondary battery and its components were measured and evaluated in the same manner as in Example 1.

In the manufacture of the binder composition for a porous membrane in step (1-3), the ratio of the aqueous dispersion liquid containing the particulate polymer obtained in step (1-2) was changed to 98 parts (in terms of solid content), and the ratio of the aqueous dispersion liquid containing the polycarboxylic acid (A) obtained in step (1-1) was changed to 2 parts (in terms of solid content).

Example 14

A lithium ion secondary battery was manufactured in the same manner as in Example 1, except that the following matters were changed. Then, the manufactured lithium ion secondary battery and its components were measured and evaluated in the same manner as in Example 1.

In the manufacture of the binder composition for a porous membrane in step (1-3), the ratio of the aqueous dispersion liquid containing the particulate polymer obtained in step (1-2) was changed to 55 parts (in terms of solid content) and the ratio of the aqueous dispersion liquid containing the polycarboxylic acid (A) obtained in step (1-1) was changed to 45 parts (in terms of solid content).

Example 15

A lithium ion secondary battery was manufactured in the same manner as in Example 1, except that the following matters were changed. Then, the manufactured lithium ion secondary battery and its components were measured and evaluated in the same manner as in Example 1.

In the pH adjustment in the preparation of the particulate polymer in step (1-2), an aqueous sodium hydroxide solution was added to adjust the pH not to 6.5 but to 5.5.

Example 16

A lithium ion secondary battery was manufactured in the same manner as in Example 1, except that the following matters were changed. Then, the manufactured lithium ion secondary battery and its components were measured and evaluated in the same manner as in Example 1.

In the pH adjustment in the manufacture of the slurry for a porous membrane in step (1-4), an aqueous sodium hydroxide solution was added to adjust the pH not to 9.0 but to 7.1.

Example 17

A lithium ion secondary battery was manufactured in the same manner as in Example 1, except that the following matters were changed. Then, the manufactured lithium ion secondary battery and its components were measured and evaluated in the same manner as in Example 1.

In the manufacture of the particulate polymer in step (1-2), the monomer composition was changed to a composition consisting of 20 parts of styrene, 74.8 parts of 2-ethylhexyl acrylate, 2 parts of methacrylic acid, 1.6 parts of N-methylol acrylamide, and 1.6 parts of acrylamide.

Comparative Example 1

A lithium ion secondary battery was manufactured in the same manner as in Example 1, except that the following matters were changed. Then, the manufactured lithium ion secondary battery and its components were measured and evaluated in the same manner as in Example 1.

In the manufacture of the polycarboxylic acid (A) in step (1-1), the monomer composition was changed to a composition consisting of 10 parts of methacrylic acid (a carboxylic acid group-containing monomer), 68 parts of ethyl acrylate (monomer (U1)), 20.2 parts of butyl acrylate (monomer (U2)), 0.8 parts of ethylene dimethacrylate (crosslinkable monomer), and 1.0 part of ammonium polyoxyalkylene alkenyl ether sulfate (reactive surfactant).

Comparative Example 2

A lithium ion secondary battery was manufactured in the same manner as in Example 1, except that the following matters were changed. Then, the manufactured lithium ion secondary battery and its components were measured and evaluated in the same manner as in Example 1.

In the manufacture of the polycarboxylic acid (A) in step (1-1), the monomer composition was changed to a composition consisting of 60 parts of methacrylic acid (a carboxylic acid group-containing monomer), 19 parts of ethyl acrylate (monomer (U1)), 19.2 parts of butyl acrylate (monomer (U2)), 0.8 parts of ethylene dimethacrylate (crosslinkable monomer), and 1.0 part of ammonium polyoxyalkylene alkenyl ether sulfate (reactive surfactant).

Comparative Example 3

A lithium ion secondary battery was manufactured in the same manner as in Example 1, except that the following matters were changed. Then, the manufactured lithium ion secondary battery and its components were measured and evaluated in the same manner as in Example 1.

In the pH adjustment in the manufacture of the binder composition for a porous membrane in step (1-3), sodium hydroxide was added to adjust the pH not to 6.0 but to 7.5.

The evaluation results in Examples and Comparative Examples are illustrated in Table 1 to Table 3.

TABLE 1

|  | Example 1 | Example 2 | Example 3 | Example 4 | Example 5 | Example 6 | Example 7 |
|---|---|---|---|---|---|---|---|
| MM amount | 30 | 28 | 35 | 22 | 44 | 30 | 30 |
| EA amount | 56 | 58 | 45.5 | 56 | 29 | 56 | 56 |
| BA amount | 12.2 | 12.2 | 17.7 | 20.2 | 25.2 | 12.2 | 12.2 |
| EDMA amount | 0.8 | 0.8 | 0.8 | 0.8 | 0.8 | 0.8 | 0.8 |
| Polycarboxylic acid pH | 4.0 | 4.0 | 4.0 | 4.0 | 4.0 | 3.3 | 6.4 |
| EA/BA ratio | 4.6 | 4.8 | 2.6 | 2.8 | 1.2 | 4.6 | 4.6 |
| Polycarboxylic acid Tg | 15° C. | 10° C. | 25° C. | −5° C. | 47° C. | 15° C. | 15° C. |
| Haze at pH 6.5 | 85% | 85% | 85% | 85% | 85% | 85% | 85% |
| Haze at pH 8.0 | 30% | 30% | 30% | 45% | 30% | 30% | 30% |
| Particulate polymer type | P1 | P1 | P1 | P1 | P1 | P1 | P1 |
| Particulate:polycarboxylic acid ratio | 90:10 | 90:10 | 90:10 | 90:10 | 90:10 | 90:10 | 90:10 |
| Binder pH | 6.0 | 6.0 | 6.0 | 6.0 | 6.0 | 6.0 | 6.4 |
| Slurry pH | 9.0 | 9.0 | 9.0 | 9.0 | 9.0 | 9.0 | 9.0 |
| Slurry viscosity mPa · s | 100 | 100 | 100 | 85 | 100 | 100 | 100 |
| Adhesion strength | A | A | A | A | B | A | A |
| Binder stability | A | A | A | A | A | B | B |
| High-temperature cycle property | A | A | A | B | A | A | A |

TABLE 2

|  | Example 8 | Example 9 | Example 10 | Example 11 | Example 12 | Example 13 | Example 14 |
|---|---|---|---|---|---|---|---|
| MM amount | 30 | 30 | 35 | 30 | 30 | 30 | 30 |
| EA amount | 34 | 59.5 | 51 | 56 | 56 | 56 | 56 |
| BA amount | 34.2 | 8.7 | 12.2 | 12.2 | 12.2 | 12.2 | 12.2 |
| EDMA amount | 0.8 | 0.8 | 0.8 | 0.8 | 0.8 | 0.8 | 0.8 |
| Polycarboxylic acid pH | 4.0 | 4.0 | 4.0 | 4.0 | 4.0 | 4.0 | 4.0 |
| EA/BA ratio | 1.0 | 6.8 | 4.2 | 4.6 | 4.6 | 4.6 | 4.6 |
| Polycarboxylic acid Tg | 5° C. | 17° C. | 28° C. | 15° C. | 15° C. | 15° C. | 15° C. |
| Haze at pH 6.5 | 85% | 85% | 85% | 85% | 85% | 85% | 85% |
| Haze at pH 8.0 | 40% | 30% | 30% | 30% | 30% | 30% | 30% |
| Particulate polymer type | P1 | P1 | P1 | P2 | P3 | P1 | P1 |
| Particulate:polycarboxylic acid ratio | 90:10 | 90:10 | 90:10 | 90:10 | 90:10 | 98:2 | 55:45 |
| Binder pH | 6.0 | 6.0 | 6.0 | 6.0 | 6.0 | 6.0 | 6.0 |
| Slurry pH | 9.0 | 9.0 | 9.0 | 9.0 | 9.0 | 9.0 | 9.0 |
| Slurry viscosity mPa · s | 90 | 100 | 100 | 100 | 100 | 80 | 120 |
| Adhesion strength | A | B | B | B | A | A | A |
| Binder stability | A | A | A | A | A | A | A |
| High-temperature cycle property | B | A | A | A | B | B | B |

TABLE 3

|  | Example 15 | Example 16 | Example 17 | Comparative Example 1 | Comparative Example 2 | Comparative Example 3 |
|---|---|---|---|---|---|---|
| MM amount | 30 | 30 | 30 | 10 | 60 | 30 |
| EA amount | 56 | 56 | 56 | 68 | 19 | 56 |
| BA amount | 12.2 | 12.2 | 12.2 | 20.2 | 19.2 | 12.2 |
| EDMA amount | 0.8 | 0.8 | 0.8 | 0.8 | 0.8 | 0.8 |

TABLE 3-continued

|  | Example 15 | Example 16 | Example 17 | Comparative Example 1 | Comparative Example 2 | Comparative Example 3 |
|---|---|---|---|---|---|---|
| Polycarboxylic acid pH | 4.0 | 4.0 | 4.0 | 4.0 | 4.0 | 4.0 |
| EA/BA ratio | 4.6 | 4.6 | 4.6 | 3.4 | 1.0 | 4.6 |
| Polycarboxylic acid Tg | 15° C. | 15° C. | 15° C. | −30° C. | 100° C. | 15° C. |
| Haze at pH 6.5 | 85% | 85% | 85% | 85% | 85% | 85% |
| Haze at pH 8.0 | 30% | 30% | 30% | 85% | 30% | 30% |
| Particulate polymer type | P1 | P1 | P4 | P1 | P1 | P1 |
| Particulate:polycarboxylic acid ratio | 90:10 | 90:10 | 90:10 | 90:10 | 90:10 | 90:10 |
| Binder pH | 5.1 | 6.0 | 6.0 | 6.0 | 6.0 | 7.5 |
| Slurry pH | 9.0 | 7.1 | 9.0 | 9.0 | 9.0 | 9.0 |
| Slurry viscosity mPa · s | 100 | 80 | 100 | 50 | 100 | 100 |
| Adhesion strength | B | A | B | C | D | C |
| Binder stability | A | A | A | C | C | D |
| High-temperature cycle property | A | B | A | D | C | C |

Abbreviations in the tables mean as follows.

MAA amount: Ratio of methacrylic acid added for preparation of polycarboxylic acid (A), unit: parts by weight.

EA amount: Ratio of ethyl acrylate added for preparation of polycarboxylic acid (A), unit: parts by weight.

BA amount: Ratio of butyl acrylate added for preparation of polycarboxylic acid (A), unit: parts by weight.

EDMA amount: Ratio of ethylene dimethacrylate added for preparation of polycarboxylic acid (A), unit: parts by weight.

Polycarboxylic acid pH: pH of prepared aqueous dispersion liquid containing polycarboxylic acid (A).

EA/BA ratio: Ratio of ethyl acrylate/butyl acrylate added for preparation of polycarboxylic acid (A).

Polycarboxylic acid Tg: Glass transition temperature of prepared polycarboxylic acid (A).

Haze at pH 6.5: Haze of aqueous solution of prepared polycarboxylic acid (A) at pH 6.5.

Haze at pH 8.0: Haze of aqueous solution of prepared polycarboxylic acid (A) at pH 8.0.

Particulate polymer type: Type of used particulate polymer.

Particulate polymer P1 obtained by polymerizing monomer composition consisting of 92.8 parts of butyl acrylate, 2 parts of acrylonitrile, 2 parts of methacrylic acid, 1.6 parts of N-methylol acrylamide, and 1.6 parts of acrylamide; ratio of (meth)acrylamide monomer: 3.2 parts in total.

Particulate polymer P2 obtained by polymerizing monomer composition consisting of 95 parts of butyl acrylate, 2 parts of acrylonitrile, 2 parts of methacrylic acid, 0.5 parts of N-methylol acrylamide, and 0.5 parts of acrylamide; ratio of (meth)acrylamide monomer: 1.0 part in total.

Particulate polymer P3 obtained by polymerizing monomer composition consisting of 92.2 parts of butyl acrylate, 2 parts of acrylonitrile, 2 parts of methacrylic acid, 1.9 parts of N-methylol acrylamide, and 1.9 parts of acrylamide; ratio of (meth)acrylamide monomer: 3.8 parts in total.

Particulate polymer P4 obtained by polymerizing monomer composition consisting of 20 parts of styrene, 74.8 parts of 2-ethylhexyl acrylate, 2 parts of methacrylic acid, 1.6 parts of N-methylol acrylamide, and 1.6 parts of acrylamide; ratio of (meth)acrylamide monomer: 3.2 parts in total.

Particulate: polycarboxylic acid ratio: Weight ratio between particulate polymer amount (in terms of solid content) and polycarboxylic acid (A) amount (in terms of solid content) used in manufacture of binder composition for a porous membrane.

Binder pH: pH of manufactured binder composition for a porous membrane.

Slurry pH: pH of manufactured slurry.

Slurry viscosity mPa·s: Viscosity of manufactured slurry, unit: mPa·s.

As illustrated by the results in Table 1 to Table 3, the binder composition according to the present invention including the polycarboxylic acid (A) exhibited favorable preservation stability, and the slurry for a porous membrane according to the present invention prepared with the binder composition exhibited viscosity suitable for application. Furthermore, the porous membrane formed with the slurry exhibited high adhesion strength, and the secondary battery manufactured with the porous membrane exhibited favorable high-temperature cycle property.

The invention claimed is:

1. A binder composition for a porous membrane of a secondary battery, comprising a polycarboxylic acid and water, wherein
   the polycarboxylic acid includes a carboxylic acid group-containing monomer unit in an amount of 20% by weight or more and 50% by weight or less,
   the binder composition for a porous membrane of a secondary battery has a pH of 6.5 or less,
   at least part of the polycarboxylic acid is dispersed in the water, and
   the polycarboxylic acid has a haze of 60% or more at a pH of 6.5 and a haze of less than 60% at a pH of 8.0, wherein the haze is obtained by measuring scattered light and total transmitted light at an optical path length of 30 mm of an aqueous solution of the polycarboxylic acid having a concentration of 10%.

2. The binder composition for a porous membrane of a secondary battery according to claim 1, wherein the polycarboxylic acid includes an alkyl (meth)acrylate unit in an amount of 50% by weight or more.

3. The binder composition for a porous membrane of a secondary battery according to claim 2, wherein
   the alkyl (meth)acrylate unit includes an alkyl (meth) acrylate unit (U1) having an alkyl group having 1 to 3 carbon atoms and an alkyl (meth)acrylate unit (U2) having an alkyl group having 4 to 6 carbon atoms, and the unit (U1) and the unit (U2) in the polycarboxylic acid have a weight ratio U1/U2 of 1.0 to 10.0.

4. The binder composition for a porous membrane of a secondary battery according to claim 1, wherein the polycarboxylic acid has a glass transition temperature of lower than 30° C.

5. A slurry for a porous membrane of a secondary battery, comprising a non-conductive particle, a polycarboxylic acid, and water, wherein
the polycarboxylic acid includes a carboxylic acid group-containing monomer unit in an amount of 20% by weight or more and 50% by weight or less,
the slurry for a porous membrane of a secondary battery has a pH of more than 7.0, and
the polycarboxylic acid has a haze of 60% or more at a pH of 6.5 and a haze of less than 60% at a pH of 8.0, wherein the haze is obtained by measuring scattered light and total transmitted light at an optical path length of 30 mm of an aqueous solution of the polycarboxylic acid having a concentration of 10%.

6. A porous membrane for a secondary battery, obtained by forming a layer of the slurry for a porous membrane of a secondary battery according to claim 5 and drying the formed layer.

7. A secondary battery comprising the porous membrane for a secondary battery according to claim 6.

8. The binder composition for a porous membrane of a secondary battery according to claim 2, wherein the polycarboxylic acid has a glass transition temperature of lower than 30° C.

9. The binder composition for a porous membrane of a secondary battery according to claim 3, wherein the polycarboxylic acid has a glass transition temperature of lower than 30° C.

* * * * *